(12) United States Patent
Hattori et al.

(10) Patent No.: US 6,546,327 B2
(45) Date of Patent: Apr. 8, 2003

(54) RUNNING CONTROL APPARATUS AND METHOD

(75) Inventors: Akira Hattori, Nagoya (JP); Nobuyuki Furui, Nisshin (JP); Hironori Miyakoshi, Seto (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/921,710

(22) Filed: Aug. 6, 2001

(65) Prior Publication Data
US 2002/0023793 A1 Feb. 28, 2002

(30) Foreign Application Priority Data
Aug. 29, 2000 (JP) ......................................... 2000-258970

(51) Int. Cl.[7] ............................. B60T 7/12; G05D 1/00; G06F 17/00; G06F 7/00
(52) U.S. Cl. ......................... 701/96; 701/98; 180/168; 180/169
(58) Field of Search .................... 701/96, 93, 300, 701/301, 70, 98; 180/179, 169, 271, 168; 342/70, 71, 27, 118, 195; 340/435, 903; 303/122.05, 122.01

(56) References Cited

U.S. PATENT DOCUMENTS

| | | | | |
|---|---|---|---|---|
| 5,510,990 A | * | 4/1996 | Hibino et al. | 180/169 |
| 5,710,565 A | * | 1/1998 | Shirai et al. | 340/903 |
| 6,018,308 A | * | 1/2000 | Shirai | 342/118 |
| 6,134,497 A | * | 10/2000 | Hayashi et al. | 340/435 |
| 6,380,885 B2 | * | 4/2002 | Shirai et al. | 342/118 |
| 6,401,024 B1 | * | 6/2002 | Tange et al. | 180/170 |
| 6,427,111 B1 | * | 7/2002 | Dieckmann | 180/179 |

FOREIGN PATENT DOCUMENTS

| | | |
|---|---|---|
| JP | 8-192659 | 7/1996 |
| JP | 9-323628 | 12/1997 |

* cited by examiner

Primary Examiner—Jacques H. Louis-Jacques
(74) Attorney, Agent, or Firm—Oliff & Berridge, PLC

(57) ABSTRACT

A running control apparatus and method control the state of running of a vehicle based on a relative positional relationship between the vehicle and a preceeding vehicle. In a case where a brake is actuated if the deceleration deviation obtained by subtracting an actual deceleration from a target deceleration is at least a third threshold $\Delta\alpha s3$, the brake is actuated provided that an object body detected by a laser radar device is a preceeding vehicle and that the same-lane probability that the preceeding vehicle is running in the same lane as the vehicle is at least a set probability. Thus, the brake is actuated when there is a high probability that braking is needed. Therefore, erroneous operation of the brake can be reduced.

23 Claims, 19 Drawing Sheets

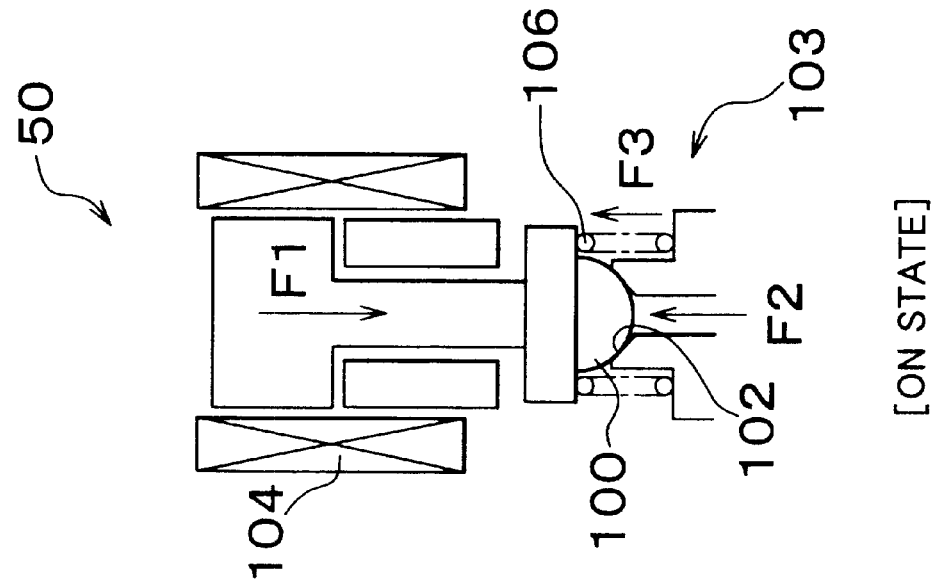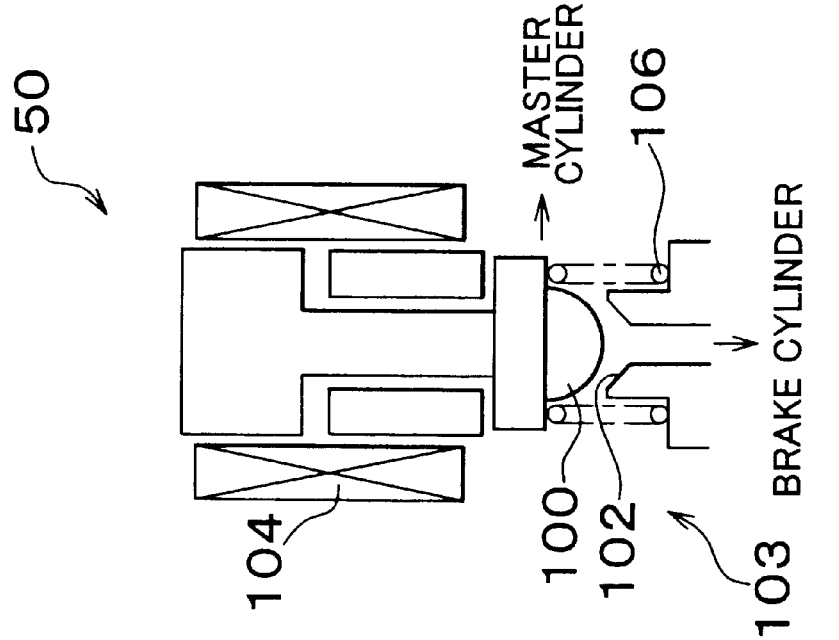

RUNNING CONTROL APPARATUS AND METHOD

INCORPORATION BY REFERENCE

The disclosure of Japanese Patent Application No. 2000-258970 filed on Aug. 29, 2000, including the specification, drawings and abstract is incorporated herein by reference in its entirety.

BACKGROUND OF THE INVENTION

1. Field of Invention

The invention relates to a running control apparatus and method.

2. Description of Related Art

According to a running control apparatus described in JP-A-9-323628, a brake that reduces rotation of a wheel is actuated when the inter-vehicle distance between a vehicle and a preceding vehicle (hereinafter referred to as an inter-vehicle distance) becomes equal to or less than a set value. Therefore, the vehicle can be reliably decelerated, and excessively close approach to a vehicle ahead can be avoided.

However, the above-identified running control apparatus actuates the brake without consideration as to whether a preceding vehicle is running in the same lane as the vehicle. Therefore, if the preceding vehicle is not running in the same lane as the vehicle, the apparatus may unnecessarily actuate the brake.

SUMMARY OF THE INVENTION

It is one object of the invention to avoid unnecessary actuation of a brake by a running control apparatus that controls the state of running of a vehicle based on a relative positional relationship between the vehicle and a preceding vehicle. This object can be achieved by implementing a running control apparatus and method according to the aspects of the invention described hereinafter. It should be understood that the technical features described in this specification and combinations thereof are not limited to the following embodiments. Furthermore, a plurality of features described herein do not have to be adopted altogether. The invention includes one or more of the various features used singularly or together.

According to one aspect of the invention, a running control apparatus and method controls a running state of a vehicle based on a relative positional relationship between the vehicle and a preceding vehicle running ahead of the vehicle in a preset area. It determines a probability that an object detected in the preset area is the preceding vehicle that is running ahead in the same lane as the vehicle. Then, the invention actuates a brake that retards rotation of a wheel of the vehicle when a relative positional relationship between the vehicle and the preceding vehicle indicates that the vehicle should be decelerated, wherein the relative positional relationship between the vehicle and the preceding vehicle indicating that the vehicle should be decelerated includes a state in which a the determined probability is equal to or greater than a preset probability.

In the running control apparatus described as above, the brake is actuated if the probability that a body detected in the preset area is a preceding vehicle running in the same lane as the vehicle (hereinafter, simply referred to as "same-lane probability") is equal to or greater than a set probability value. When the same-lane probability is low, the brake is not actuated. Therefore, unnecessary operation of the brake can be avoided. A running control apparatus and method described above may also prohibit actuation of the brake if the same-lane probability is less than the set probability.

The relative positional relationship between the vehicle and a preceding vehicle may be represented by the relative position of the preceding vehicle to the vehicle as well as the changing speed of the relative position, the changing acceleration thereof, or specific data that cause such change, for example, the speed of the vehicle or the preceding vehicle, the acceleration thereof, etc. The relative position may be expressed as a point in a plane coordinate system defined by a direction parallel to a predicted running line of the vehicle (which may be a straight line extending through the center of the vehicle in the longitudinal direction or a curve determined taking into account the steering angle or the running speed, the yaw rate, etc.) and a direction perpendicular thereto (lateral direction of the vehicle). The inter-vehicle distance refers to the distance between the vehicle and a preceding vehicle. If the predicted running line is a curve, the inter-vehicle distance may be expressed as a straight-line or a curve. Furthermore, if the predicted running line is a curve, the relative position may be expressed as a point in an orthogonal plane coordinate system obtained by developing the curve into a straight line. Based on the relative position, it is possible to determine whether the preceding vehicle is located in a specific area that is predetermined in an orthogonal plane coordinate system, or to acquire a probability that the preceding vehicle is located in the specific area. The result of such determination and the probability may represent the relative positional relationship. A value obtained by dividing the inter-vehicle distance by the running speed of the vehicle may also represent the relative positional relationship.

The same-lane probability determining process may include determining whether an object detected in the preset area is the preceding vehicle so as to acquire a probability that the body determined as a preceding vehicle is running in the same lane as the vehicle. This preceding vehicle determining process may include determining whether the object detected in the preset area is in a moving state or a stationary state. The moving state determining process may determine whether the object body is in a stationary state based on, for example, the running speed of the vehicle and a relative speed between the vehicle and the object body. If an approaching speed, that is, a kind of the relative speed, is greater than or equal to a set approaching speed (which may be either a constant value or a value that is set based on the running speed of the vehicle), or if the relative speed is substantially equal to the running speed of the vehicle (e.g., if the absolute value of a difference between the aforementioned two speeds is less than or equal to a positive set speed difference value), it may be determined that the object body is in a stationary state. The preceding vehicle determining process may include discriminating whether the preseecinf vehicle is at least one of a vehicle running on the opposite lane and a vehicle passing an intersection. The process for determining whether a vehicle is running on the opposite lane is operable to determine that a target body is an oncoming vehicle if the approaching speed of the vehicle with respect to the target body is greater than the running speed of the vehicle by at least a set approaching speed. The process for determining whether a vehicle is passing an intersection is operable to determine that a target body is a vehicle running on the crossroad if, for example, the absolute value of the moving speed of the target body in a direction perpendicular to the predicted running line of the vehicle is greater than or equal to a set moving speed. The preceding vehicle determining process may include determining that the detected object is a vehicle (which may or may not include a two-wheeled vehicle) when the detected object has a size (at least one of the height and width) larger than a preset size, and determining that the detected object is not the vehicle when the detected object has a size smaller than the preset size.

The same-lane probability of a preceding vehicle may be determined, for example, based on a relative position of the preceding vehicle determined as mentioned above, that is, a relative position thereof in a direction perpendicular to a direction parallel to the predicted running line of the vehicle. That is, the smaller the deviation of the preceding vehicle from the predicted running line of the vehicle in a perpendicular direction becomes, the higher the same-lane probability becomes. Furthermore, as will be described later, the same-lane probability may be determined by dividing the area defined by the orthogonal plane coordinate system mentioned above into a plurality of areas, and correlating the individual divided areas and values of the same-lane probability so as to be pre-stored. In this case, the value corresponding to the area to which the relative position of the center point of a predetermined vehicle belongs may be determined as a same-lane probability. Furthermore, the value corresponding to the area to which the relative position of a point that represents the preceding vehicle, instead of the center point thereof, may also be determined as the same-lane probability. If a preceding vehicle is defined by a plurality of points within a single body, it is not always the case that all the points belong to a single area; rather, there are cases where the points belong to a plurality of areas. In such a case, the same-lane probability may be determined based on the values corresponding to the plurality of areas. For example, the mean value or an intermediate value of the values of probability corresponding to the areas may be determined as the same-lane probability. The same-lane probability may be a value determined taking into consideration a weighting, for example, a manner of weighting in which the weighting of the value corresponding to the area to which the center point of the object body belongs is made greater than the weighting of the values corresponding to the areas to which points in end portions of the object body belong. If, in a case where at least one of a plurality of areas is defined as a specific area, at least one of a plurality of points of a preceding vehicle belongs to the specific area, the value corresponding to that specific area may be determined as a same-lane probability.

According to another aspect of the invention, the braking system (deceleration device) of the running control apparatus is operable to actuate the brake to retard rotation of the wheel of the vehicle if a degree of a necessity to decelerate the vehicle, which is determined based on the relative positional relationship, is higher than a preset degree.

It is possible to determine the necessity for decelerating the vehicle, a degree of the necessity and the like based on the relative positional relationship between the vehicle and a preceding vehicle. The necessity for deceleration may be determined, for example, based on actual and desired relative positional relationships. The desired relative positional relationship may be, for example, a requested relative positional relationship intended by a vehicle operator, a set relative positional relationship predetermined based on safety, or the like. It is often the case that the requested relative positional relationship or the set relative positional relationship remains unchanged during one running control cycle. Therefore, the necessity for deceleration of the vehicle may be governed by the actual relative positional relationship between the vehicle and the preceding vehicle. The requested relative positional relationship may be set, for example, by an operation performed by the operator. The operator sets a desired inter-vehicle distance, a desired inter-vehicle time, etc., for example, by operating an operating member (a switch, a touch panel, etc.). The brake may be actuated if deceleration is required and the same-lane probability is greater than or equal to a set probability. Alternatively, the brake may be actuated if the degree of the necessity is greater than or equal to a set degree and the same-lane probability is greater than or equal to a set probability.

Assuming that the desired relative positional relationship is a requested inter-vehicle distance requested by a vehicle operator, if the actual inter-vehicle distance is less than the requested inter-vehicle distance, it can be determined that there is a necessity for deceleration. The greater the difference between the requested and actual inter-vehicle distances (requested inter-vehicle distance—actual inter-vehicle distance) becomes, the higher the necessity for deceleration is considered to be. Thus, the necessity for deceleration or the degree of the necessity can be detected based on the deviation, that is, positive/negative of a deviation obtained by subtracting the actual inter-vehicle distance from the requested inter-vehicle distance, or the magnitude of the absolute value of the deviation. The necessity for deceleration or the degree of the necessity may also be determined based on, instead of the deviation, a quantity related to the deviation, for example, a deviation ratio obtained by dividing the deviation by the requested inter-vehicle distance, or the like. According to the running control apparatus and method described herein, the possibility of unnecessary actuation of the brake can be further reduced.

As for the brake, it is desirable that the state of operation of the brake (for example, the amount of braking (hard versus soft)) be controlled to a state corresponding to the necessity. However, the invention is not limited to this. The brake may be actuated in a predetermined state when the necessity arises.

Furthermore, it is desirable that the brake be operable without an operation of a brake operating member performed by a vehicle operator.

According to another aspect of the invention, a running control apparatus may include a body detector that detects a body in the preset area in front of the vehicle. The set area may extend two-dimensionally, or three-dimensionally. The body detector may detect a body based on a state in which a reflection of electromagnetic waves emitted forward is received, for example, a laser radar device, or it may detect a body based on a video image that has been taken by, for example, a CCD camera.

The set area may be determined based on an area in which a body can be detected by the body detector. For example, the set area may be determined based on a common area between an area of the electromagnetic wave irradiation and an area that allows reception of reflected waves, or may be determined based on an area that allows the image to be taken by the CCD camera. Such an area that allows detection of a body is determined by the body detector or the like, and in some cases, may be determined by climate or the like as well. If the set area is a two-dimensional area, the area may be specified based on, for example, at least one of: (a) the angle of electromagnetic wave radiation in a horizontal direction, and (b) a shorter one of the distance of electromagnetic wave radiation and the distance of reflected wave reception. If the set area is a three-dimensional area, the area may be determined based on, for example, (c) the angle of electromagnetic wave radiation in a horizontal direction, (d) the angle of radiation in a vertical direction, (e) a shorter one of the radiation distance and the reception distance, etc.

According to another aspect of the invention, the running control apparatus detects an actual deceleration of the vehicle. The braking system is operable to actuate the brake if a deceleration deviation-related amount is equal to or greater than a preset deviation-related amount, the deceleration deviation-related amount being related to a value obtained by subtracting the detected actual deceleration from a target deceleration determined based on a desired relative positional relationship and an actual relative positional relationship detected by the body detector.

In the running control apparatus described above, a target deceleration is determined based on the actual relative positional relationship and the desired relative positional relationship. The brake is actuated if the deceleration deviation-related amount related to a value obtained by subtracting the actual deceleration from the target deceleration is greater than or equal to the set deviation-related amount. It is appropriate to actuate the brake in case of excessive shortage of the actual deceleration with respect to the target deceleration.

The features described as above may be adopted independently of each other. More specifically, even if the same-lane probability of a detected body is smaller than a set probability, it is possible to actuate the brake in the case where the deceleration deviation-related amount is at least the set amount related to the deviation.

According to another aspect of the invention, if the relative positional relationship indicates that the vehicle should be decelerated, the braking system controls at least one of a driving device that supplies power to drive the vehicle and a power transmitting device that is disposed between the driving device and the wheel of the vehicle such that the vehicle is decelerated, prior to actuation of the brake.

In the above-described running control apparatus, the control of the driving device or the power transmitting device is performed before actuation of the brake if there arises a necessity to decelerate the vehicle. That is, the control of the driving device or the power transmitting device is performed prior to actuation of the brake. Therefore, the frequency of operation of the brake can be correspondingly reduced.

The aspect of the invention in which the control of the driving device or the power transmitting device is given a higher priority is, for example, an aspect in which if the necessity to decelerate the vehicle is low, the driving device or the power transmitting device is controlled, and in which if the necessity becomes higher than a set value, actuation of the brake is performed in addition to the control of the driving device or the power transmitting device, or instead of the control of the driving device or the power transmitting device.

Due to the control of the driving device, the driving torque transferred to the wheel is reduced (which includes being changed to a negative torque) so that the revolution speed of the wheel is reduced. Due to the control of the power transmitting device, the ratio between the revolution speed of the driving device and the revolution speed of the wheel is changed so as to reduce the revolution speed of the wheel. Such deceleration includes not only deceleration based on generally-termed engine braking, but also deceleration achieved by making the drive torque transferred to the wheel smaller than the running resistance torque.

If the driving device includes an engine, a control of reducing the output torque of the engine or the like is included in the aforementioned deceleration. If the driving device includes an electric motor, a control of reducing the output torque of the electric motor or the like (including the performance of regenerative braking by an electric motor) is included in the deceleration.

According to another aspect of the invention, the braking system is operable to control at least one of the driving device and the power transmitting device if the relative positional relationship meets a preset controlling condition, and the deceleration device is operable to actuate the brake if the relative positional relationship meets a brake actuating condition.

It is desirable that the controlling condition be set so as to be satisfied when the degree of necessity to decelerate the vehicle is lower as compared with the brake actuating condition.

According to another aspect of the invention, the running control apparatus permits or prohibits actuation of the brake based on at least one of a state of a brake control device that controls a brake operation state and a running state of the vehicle.

In this aspect, if actuation of the brake is prohibited, the brake will not be actuated even in a case where the relative positional relationship indicates that there is a necessity to decelerate the vehicle. It may be deemed undesirable to actuate the brake without a brake operation performed by a vehicle operator, that is, without the operator being aware of the brake actuation.

According to another aspect of the invention, the actuation of the brake is inhibited in at least one state of (a) a case where a value corresponding to a slip state of the wheel of the vehicle is equal to or greater than a set value, or a case where there is a high possibility that the value corresponding to the slip state of the wheel of the vehicle becomes equal to or greater than the set value, and (b) the brake control device is in a state in which actuation of the brake is undesirable. If the value corresponding to the slip state of the wheel of the vehicle is equal to or greater than the set value, there is a danger that, the wheels are brought into a locked state from a slip state by the braking operation. Even if the set state has not been currently reached, there is a danger that the braking operation may bring the wheels into the lock state from the slip state. It is, thus, preferable to prohibit the brake actuation.

It also is undesirable to actuate the brake in case of overheating of a brake liquid pressure actuator that is actuated when supplied with electric energy, or in the case of an abnormal state of the brake control device.

According to another aspect of the invention, the running control apparatus includes an alarm device which produces an alarm when actuation of the brake is prohibited by the brake actuation permitting/prohibiting device.

If the alarm device is provided, it is possible to notify a vehicle operator that actuation of the brake has been prohibited even though the relative positional relationship indicates that it is desirable to actuate the brake. Then the vehicle operator is able to perform an appropriate operation in response to the alarm. If braking is required, the operator is allowed to operate the brake operating member in accordance with the necessity.

According to another aspect of the invention, the deceleration device includes a brake control device which controls an operation state of a brake, and the brake control device includes a cruise control portion which controls an operation state of the brake in accordance with a necessity to decelerate the vehicle.

During a cruise control, a control is performed so that the relative positional relationship between the vehicle and a preceding vehicle continues to be a requested relative positional relationship requested by an operating person or a preset relative positional relationship.

According to another aspect of the invention, the brake control device includes an antilock control portion which controls the brake such that in a case where the brake is in an actuated state and where a value indicating a slip state of the wheel that is in a locked state is larger than a preset value even when a brake operating member is not operated by a vehicle operator, the slip state of the wheel is brought into an appropriate range.

In a case where an automatic braking brings the wheels into a locked state from a slip state even when no braking is performed by a vehicle operator, antilock control is started. As a result, even when the wheels in the slip state are brought into the locked state owing to an automatic braking during cruise control, deterioration of the running stability of the vehicle can be effectively avoided. Therefore, it is preferable to employ both the cruise control and the antilock control. It is further preferable to prohibit the cruise control upon the start of the antilock controlling.

According to another aspect of the invention, the running control apparatus includes a vehicle behavior control portion which controls at least one of the brake and the driving device, if a behavior of the vehicle is unstable as compared with a set state, such that the behavior of the vehicle is brought into an appropriate state.

In the running control apparatus described as above, it is preferable to prohibit the cruise control upon the start of the vehicle behavior control, as is done in the aforementioned case.

According to another aspect of the invention, a running control apparatus that controls a running state of a vehicle based on a relative positional relationship between the vehicle and a preceding vehicle running ahead of the vehicle in a preset area includes a control command value determination controller that determines a control command value related to deceleration of the vehicle based on the relative positional relationship. In addition, a brake controller controls a state of operation of a brake that retards rotation of a wheel in accordance with the control command value received from the control command value determination controller, and a control abnormality detector detects a control abnormality based on a logical consistency of contents of a plurality of pieces of information that include a piece of information transmitted between the control command value determination controller and the brake controller.

In the running control apparatus described above, a control abnormality is detected based on a plurality of pieces of information that include a piece of communication information. Control abnormalities are caused by mis-operations or non-operations of computers, actuators and the like, communication abnormalities, etc.

A control abnormality occurs, for example, if an actuator is not operated in accordance with a control command value, or if a control command value is not generated in accordance with a program, or if due to an abnormality of a sensor or the like, an actually occurring phenomenon related to the state of operation of the brake, the relative positional relationship between the vehicle and the preceding vehicle, etc., is not correctly detected, or if a content of control command information or a content of control result information is changed due to a communication mutation or the like.

A control abnormality can be detected if the contents of two or more pieces of information do not have a logical consistency. In this case, since the brake control device controls the state of operation of the brake in accordance with a control command value transmitted from the control command value determination controller, at least one of the two or more pieces of information may be the control command value transmission information. In that case, the control abnormality includes: (a) an abnormality that if there are a plurality of pieces of control command value transmission information, at least two of the pieces of transmission information do not have a logical consistency; (b) an abnormality that a piece of control command value transmission information and a sensor-detected value acquired by a computer or a piece of information generated by the computer, etc., do not have a logical consistency; (c) an abnormality that the content of a piece of control command value transmission information and the content of a piece of information sent back in accordance with an echo-back request do not have a logical consistency; etc.

More specifically, if a plurality of pieces of information received by the brake control device from the control command value determination controller include brake request information and information indicating a target deceleration, it may be determined that there is a logical consistency. If the pieces of information include brake request information and information indicating a target acceleration (deceleration of a negative value), it may be determined that there is a logical abnormality (a). Furthermore, if the information received by the brake control device includes brake request information, but the brake actuating force detected by a sensor is "0", it may be determined that there is no logical consistency (b). If the control command value determination controller transmits brake request information to the brake controller, but the information sent back in accordance with an echo-back request does not include brake request information, it may be determined that there is no logical consistency (c).

If in addition to the echo-back request, the transmission of information detected by the brake control device or information generated thereby is requested, it is possible to detect whether there is a logical consistency between the information transmitted from the control command value determination controller and the information transmitted from the brake control device. For example, if, in a case where the brake control device transmits information indicating a state of a brake in-operation flag that is set during operation of the brake, and that brake inoperation flag transmitted from the brake control device is in a reset state although brake request information is transmitted from the control command value determination controller, it may be determined that there is no logical consistency.

Thus, with a construction in which a control abnormality is detected based on the contents of a plurality of pieces of information that include communication information, it becomes possible to discover a mis-operation or a non-operation of the brake in an early period, and to therefore improve reliability of the running control apparatus.

It is not essential that a control abnormality be detected based on a plurality of pieces of information containing control command value transmission information. That is, it is possible to detect a control abnormality based on a plurality of pieces of information that do not include control command value transmission information. For example, a control abnormality may be detected based on a plurality of pieces of information that include a sensor-detected value acquired by a computer or information generated by the computer.

The technical features described herein can be applied to a running control apparatus described in any one of the above-described aspects of the invention.

According to another aspect of the invention, a running control apparatus includes a control device which controls at least one of a driving device that drives the vehicle and a power transmitting device disposed between the driving device and the wheel of the vehicle in response to a control command value transmitted from a control command value determining controller, wherein a control abnormality detector detects the control abnormality based on the plurality of pieces of information containing information regarding communication among the control command value determining controller, the brake controller, and the control device.

For example, if information which commands a dshift is transmitted from the control command value determining device although a cruise control switch connected to the control device is in an off state (no cruise control is required), it may be determined that there is a logical abnormality.

According to another aspect of the invention, the brake controller prohibits actuation of the brake if the control abnormality is detected by the control abnormality detector.

If actuation of the brake is prohibited upon detection of a control abnormality, a mis-operation of the brake is avoided at an earlier stage. It is also possible to prohibit the control of the driving device or the power transmitting device as well as the actuation of the brake.

Furthermore, if a construction is provided in which an alarm is produced upon detection of a control abnormality, it becomes possible to notify a vehicle operator of occurrence of a control abnormality. Then the vehicle operator can perform, for example, a braking operation in accordance with the necessity.

According to another aspect of the invention, a running control apparatus controls a running state of a vehicle based on a relative positional relationship between the vehicle and a preceding object ahead of the vehicle in a preset area. The running control apparatus determines a probability that an object detected in the set area is the preceding object that is running ahead in the same lane as the vehicle, and a braking system operates a brake that retards rotation of a wheel of the vehicle when one of the relative positional relationship between the vehicle and the preceding object indicates that the vehicle should be decelerated, wherein the relative positional relationship between the vehicle and the preceding object indicating that the vehicle should be decelerated includes a state in which the determined probability is equal to or greater than a preset probability.

The object present in the preset area in front of the vehicle may be in a moving state, or may also be in a stationary state. The running control apparatus described herein may adopt any of the technical features described in any of the above-described aspects of the invention.

BRIEF DESCRIPTION OF THE DRAWINGS

The foregoing and further objects, features and advantages of the invention will become apparent from the following description of a preferred embodiment with reference to the accompanying drawings, wherein like numerals are used to represent like elements and wherein:

FIGS. 3A and 3B are conceptual diagrams of the brake control actuator sh in FIG. 2;

DETAILED DESCRIPTION OF PREFERRED EMBODIMENT

An example of a running control apparatus in accordance with a preferred embodiment of the invention will be described hereinafter with reference to the accompanying drawings. This running control apparatus includes an alarm device.

Figure 1:
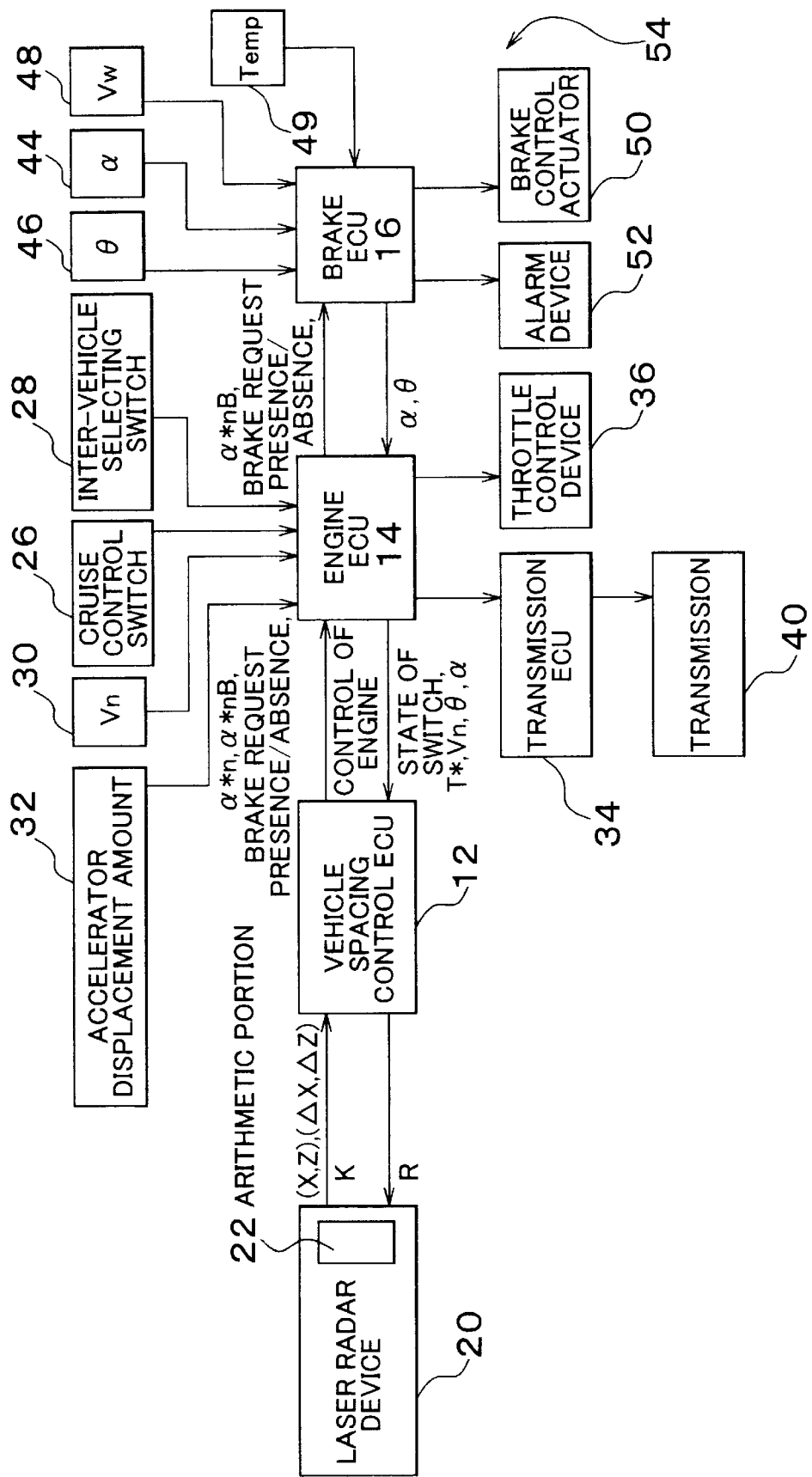
FIG. 1 is a diagram illustrating an overall construction of a running control apparatus in accordance with an embodiment of the invention.

Referring to FIG. 1, a vehicle spacing control ECU 12, an engine ECU 14 and a brake ECU 16 are each formed mainly by a computer that includes a CPU, a RAM, a ROM, an input-output portion, etc. The vehicle spacing control ECU 12 and the brake ECU 16 are connected to the engine ECU 14, and communications of information are performed among them.

A laser radar device 20 is connected to the vehicle spacing control ECU 12. The laser radar device 20 includes an arithmetic portion 22 that is formed mainly by a computer. The arithmetic portion 22 determines a relative position of a detected object body relative to the vehicle and the amount of change in the relative position, and transmits information indicating the relative position and the amount of change in the relative position to the vehicle spacing control ECU 12. Furthermore, the arithmetic portion 22 determines a probability (hereinafter, referred to as "samelane probability") K that the detected object body is a body running in the same running lane as the vehicle, and transmits the probability K to the vehicle spacing control ECU 12.

Since the laser radar device 20 is explained in JP-A-11-45398, its detailed description will be omitted. The laser radar device 20 is disposed in a front of the vehicle, for example, below a front bumper. The laser radar device 20 emits laser light in front of the vehicle, and receives light reflected from objects in front of the vehicle. The laser radar device 20 is of a two-dimensional scan type in which laser light is scanned within a predetermined irradiation area in the horizontal and perpendicular directions due to rotation of a polygon mirror. In this embodiment, the irradiation area that is irradiated with laser light is divided into 630 small sections in a pattern of 105 sections in the horizontal direction and 6 sections in the perpendicular direction. Based on the state of reception of light reflected from the small sections, an object body within the preset area is detected.

With regard to the laser radar device 20, it is possible to set an area in which an object body can be detected by the laser radar device 20. In this embodiment, however, the preset area is determined based on the irradiation area and the smaller one of the distance of laser light emission and the distance of reception of reflected light. The preset area is determined by the capability of the laser radar device 20, and may also vary with such factors as the climate.

In the laser radar device 20, areas that are estimated to indicate one and the same body (i.e., a single body) based on the state of reception of reflected light are combined, and a relative position (expressed two-dimensionally) of the combined area (one and the same object body) is determined.

The relative position is represented by a point in a two-dimensional plane coordinate system defined by a predicted running line of the vehicle and a line perpendicular to the predicted running line (i.e., a line parallel to the direction of the width of the vehicle) with reference to the vehicle. The predicted running line is determined based on the turning radius R of the vehicle and the like. The position Z of the detected object body in the predicted running direction represents the distance thereof from the vehicle along the predicted running line, that is, the inter-vehicle distance Z. The position X of the detected object body in the width direction is a deviation of the body from the vehicle in the direction perpendicular to the predicted running line of the vehicle. In this embodiment, the plane coordinate system defined by the predicted running line and a line perpendicular to the predicted running line is transformed into an orthogonal plane coordinate system by transforming the predicted running line to a straight line. The position (X, Z) in the transformed orthogonal plane coordinate system is determined as a relative position of the object body.

The same-lane probability K is determined based on the relative position (X, Z) of the object body. An area (X, Z) expressed in the orthogonal plane coordinate system is divided into a plurality of areas. Based on which one of the areas the relative position (X, Z) of the object body belongs to, the same-lane probability K is determined. A bell-shaped area in front of the vehicle, that is, a tapered area that becomes narrower in the X direction with progress in the Z direction, is set as a first area A1. An area including a portion extending in front of the first area A1 and portions extending in the X directions (directions of the vehicle width) from the first area A1 is set as a second area A2. Likewise, a third area A3, a fourth area A4, . . . are provided in that order as the distance from the vehicle increases. The nth area An has a portion that is farther apart from the vehicle than the (n-1)th area A(n-1). An area with an increased number n has a portion that spreads greater in the X direction with progress in the Z direction. Each area An is stored in correspondence to a probability Kn in the arithmetic portion 22. The value of the probability Kn decreases as the number n increases.

For example, if a center point (X, Z) of the object body belongs to the mth area Am, the same-lane probability Km corresponding to the mth area Am is set as a same-lane probability K (=Km).

Information indicating the relative position (X, Z) of the object body in the two-dimensional orthogonal coordinate system, information indicating the amount ($\Delta$X, $\Delta$Z) of change in the relative position, and information indicating the same-lane probability K are transmitted from the laser radar device 20 to the vehicle spacing control ECU 12.

The relative position (X, Z) of the object body transmitted to the vehicle spacing control ECU 12 is the relative position of the center point of the object body. However, a representative position other than the center point of the object body may also be set as the relative position of the object body.

The same-lane probability K may also be determined taking into consideration the relative position of a point in an object body other than its center point. For example, if at least a portion of an object body (e.g., a portion of an exterior thereof) belongs to the first area A1, the same-lane probability K is set to K1. Furthermore, it is also possible to determine areas to which a plurality of points representing the object body belong and to set, as a same-lane probability K, the mean value or an intermediate value of the values of probability corresponding to the determined areas. In this case, the same-lane probability K may be determined taking weighting into consideration. For example, the weighting on the area to which the center point belongs is increased, and the weighting on the areas to which points defining the external shape of the object body belong is reduced.

The same-lane probability K may be determined based on a result of detection of an object body, and may also be determined based on a previously determined same-lane probability as well. In that case, the specific weight of a present same-lane probability relative to the previous same-lane probability can be determined based on the inter-vehicle distance Z. For example, the specific weight may be increased as the inter-vehicle distance Z decreases.

It is also possible to adopt a construction in which the same-lane probability K is determined by the vehicle spacing control ECU 12.

Information indicating the relative position and the like which is transmitted from the laser radar device 20 to the vehicle spacing control ECU 12 may also be information regarding all the small sections that are considered to be object bodies after the grouping.

Based on the relative position of the object body and the amount of change in the relative position received from the laser radar device 20, the vehicle spacing control ECU 12 determines whether the object body is in a moving state or a stationary state on the basis of the relative speed of the object body and the speed of the vehicle. If an approaching speed, that is, a kind of the relative speed, is at least a preset speed, or if the absolute value of a difference between the relative speed and the speed of the vehicle is at most a preset value (if these two speeds are almost equal), it may be possible to determine that the object body is in a stationary state.

Furthermore, based on the relative position of the object body and the amount of change in the relative position, information received from the engine ECU 14, etc., the vehicle spacing control ECU 12 determines the vehicle's target decelerations $\alpha^*n$, $\alpha^*nB$, etc. Furthermore, the vehicle spacing control ECU 12 creates information for controlling the engine and the like, information indicating the presence/absence of a brake request, etc., and transmits such information to the engine ECU 14. The information indicating the presence/absence of a brake request, the information indicating the target deceleration $\alpha^*nB$, etc., are transmitted to the brake ECU 16 via the engine ECU 14.

Still further, the vehicle spacing control ECU 12 determines a turning radius R of the vehicle based on the steering angle $\theta$ of a steering wheel and the running speed Vn, and then transmits information indicating the turning radius R to the laser radar device 20. The information indicating the steering angle $\theta$ of the steering wheel is transmitted from the brake ECU 16 via the engine ECU 14. The information indicating the running speed Vn is transmitted from the engine ECU 14.

The engine ECU 14 is connected to a cruise control switch 26, an inter-vehicle time selecting switch 28, a vehicle speed sensor 30, an accelerator pedal displacement sensor 32, etc., and is also connected to a transmission ECU 34, and a throttle control device 36 that is a component element of the engine apparatus, etc. Based on the accelerator pedal displacement and the like, the engine ECU 14 controls driving states of various component elements of the engine apparatus.

The cruise control switch 26 is selectable at least between a position for commanding a cruise control and a position for not commanding the cruise control. The inter-vehicle time selecting switch 28 serves to select an inter-vehicle time in a situation where the cruise control is commanded. The cruise control switch 26 and the inter-vehicle time selecting switch 28 are operated by a vehicle operator. By operating the inter-vehicle time selecting switch 28, the vehicle operator can set a requested relative position relationship intended by the operator.

The inter-vehicle time selecting switch 28 allows selection of one of three inter-vehicle times, that is, short, intermediate and long inter-vehicle times. The short, intermediate and long inter-vehicle times represent, for example, lengths of time that correspond to inter-vehicle distances of about 40 m, about 45 m, and about 55 m when the vehicle is running at 80 km/h. In the cruise control, the state of running of the vehicle is controlled so that the inter-vehicle distance between the vehicle and the preceeding vehicle is kept equal to an inter-vehicle distance corresponding to the selected inter-vehicle time. However, if a preceeding vehicle is not detected, a control is performed such that the vehicle runs at a speed equal to or lower than a preset speed. In this case, the speed setting is separately performed by a vehicle operator.

The state of the cruise control switch 26 (information indicating a cruise control commanded or a cruise control not commanded), the state of the inter-vehicle time selecting switch 28 (information indicating a requested inter-vehicle time selected as mentioned above), and information indicating the speed of the vehicle detected by the vehicle speed sensor 30 are transmitted to the vehicle spacing control ECU 12. Such information is needed for the cruise control, and may be termed cruise control-purpose vehicle information.

The cruise control is prohibited when an accelerator pedal is operated by a vehicle operator, or when a brake pedal is operated by a vehicle operator, etc. The cruise control is also prohibited upon execution of an antilock brake control, a vehicle behavior control, and the like. It is desirable that higher priority be given to operations performed by a vehicle operator than to the cruise control. It is also desirable that higher priority be given to the antilock brake control, the vehicle behavior control, etc., than to the cruise control, in view of safety. Furthermore, the cruise control is prohibited if a system abnormality is detected. The aforementioned prohibition of the control includes at least one of a discontinuation of the control (including a temporary stop) and prohibition of start of the control.

In accordance with the information received from the vehicle spacing control ECU 12, the engine ECU 14 controls the throttle control device 36, or transmits a control command regarding the transmission speed ratio to the transmission ECU 34. In accordance with the speed ratio control command from the engine ECU 14, the transmission ECU 34 controls a transmission 40 to control the speed ratio.

The engine ECU 14 transmits to the brake ECU 16 brake control information and the like received from the vehicle spacing control ECU 12, etc. The brake control information includes information indicating the presence/absence of a brake request, information indicating the brake-purpose target deceleration $\alpha^*nb$, etc.

Instead of the control of the throttle control device 36, a control of the amount of fuel injected into a combustion chamber or the like may be performed.

The brake ECU 16 is connected to a deceleration sensor 44, a steering angle sensor 46 for detecting the steering angle $\theta$ of the steering wheel, wheel speed sensors 48 for detecting rotation speeds of wheels, a temperature sensor 49, etc. The brake ECU 16 is also connected to a brake control actuator 50, an alarm device 52, etc.

The brake control actuator 50, during the cruise control, is controlled so that the actual deceleration $\alpha$n detected by the deceleration sensor 44 approaches a brake-purpose target deceleration $\alpha^*nB$ received from the engine ECU 14. During a vehicle stability control, the brake control actuator 50 is controlled so that the behavior of the vehicle remains in a stable state based on the steering angle, the yaw rate, etc. The brake ECU 16 is an ECU for controlling the brake control actuator. As a brake ECU, it is possible to use an ECU that performs a specific control, such as an ABS ECU (antilock brake ECU), a VSC ECU (vehicle behavior ECU), etc.

The information indicating the steering angle $\theta$ of the steering wheel is transmitted to the vehicle spacing control ECU 12 via the engine ECU 14 as mentioned above.

The alarm device 52 is actuated, for example, when the inter-vehicle distance Z becomes equal to or less than an approach distance Dw, or in a case where automatic brake actuation is not desirable although brake request presence information has been transmitted, etc. In one case, the alarm device 52 is actuated in response to a command from the vehicle spacing control ECU 12. In another case, the alarm device 52 is actuated due to the state of a brake device 54 or the running state of the vehicle. In the former case, an alarm is produced mainly in order to indicate that the inter-vehicle distance has become equal to or less than the approach distance Dw, and to prompt a brake operation. In the latter case, an alarm is produced mainly in order to indicate that the automatic brake actuation has been prohibited.

The alarm device 52 may produce the same alarm or different kinds of alarms in the former and latter cases. The alarm device 52 may produce a sound, or may turn a lamp on and off. Furthermore, the alarm device 52 may output a content of alarm or warning (state of vehicle) by voice, or may display such a content in a display portion. The alarm device 52 may be a device that serves as a notification device for notifying an operator of a wide variety of information.

The deceleration sensor 44 is operable to detect the deceleration of the vehicle. In this embodiment, the deceleration is expressed as a positive value. If the acceleration is expressed as a negative acceleration as in a conventional manner, a great deceleration means a small negative acceleration, that is, an absolute value of the acceleration is great. The wheel speed sensors 48 are operable to detect rotation speeds of the individual wheels. In this embodiment, a slip state of each wheel is detected based on the rotation speeds of the individual wheels and an estimated vehicle body speed determined based on the speeds of non-driving wheels. The temperature sensor 49 detects the temperature of the brake control actuator 50. The brake control actuator 50 is actuated upon supply of electric energy. Therefore, there is a danger of overheating, for example, if the continued operation time is prolonged.

Figure 2:
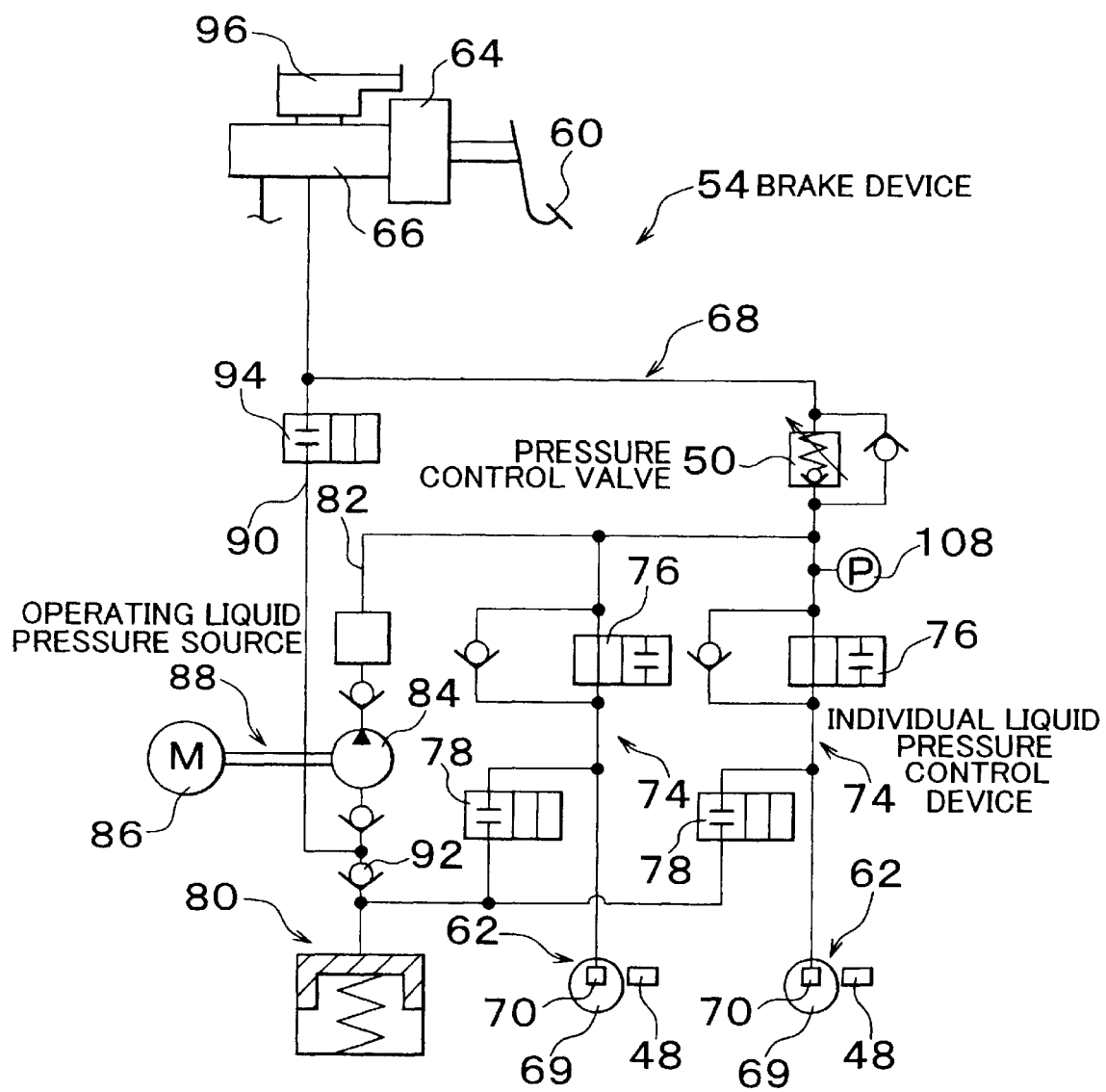
FIG. 2 is a circuit diagram of a brake device including a brake control actuator which is included in the running control apparatus sh in FIG. 1.

FIG. 2 shows a brake circuit of the brake device 54 that includes the brake control actuator 50. The brake device 54 is able to operate a brake 62 even if the brake pedal 60, that is, a brake operating member, is not operated by an operating person. That is, the brake device 54 is designed to be capable of performing automatic braking.

A master cylinder 66 is connected to the brake pedal 60 via a booster 64. The master cylinder 66 is connected to brake cylinders 70 of brakes 62 for retarding rotation of the wheels 69, via a liquid passage 68. Each brake 62 is a hydraulic brake that is operated by liquid pressure in the brake cylinder 70 to retard rotation of the wheels 69.

A pressure control valve 50, that is, the brake control actuator, is provided partway within the liquid passage 68. Individual liquid pressure control valve devices 74 are respectively provided to the brake cylinders 70. Each of the individual liquid pressure control valve devices 74 includes a pressure increasing control valve 76 and a pressure decreasing control valve 78. The pressure increasing control valve 76 of each valve device 74 is provided between the pressure control valve 50 and a corresponding one of the brake cylinders 70, and the pressure decreasing control valve 78 is provided between the brake cylinder 70 and a reservoir 80.

A pump passage 82 extends from the reservoir 80, and connects to the liquid passage 68 dstream of the pressure control valve 50. The pump passage 82 is provided with a pump 84. The pump 84 is driven by a pump motor 86. The pump 84 and the pump motor 86 constitute an operating liquid pressure source 88.

An operating liquid supply passage 90 extends from the master cylinder 66, and connects to a portion of the pump passage 82 extending on a pump 84 side of a check valve 92. The check valve 92 prevents flow of the operating liquid from the master cylinder 66 to the reservoir 80. Due to the check valve 92, the operating liquid flowing out of the master cylinder 66 is pumped up directly by the pump 84. An electromagnetic open-close valve 94 is provided partway in the operating liquid supply passage 90. When the electromagnetic open-close valve 94 is set to an open state, the operating liquid flows out of the master cylinder 66. That is, the operating fluid is supplied from a master reservoir 96 via the master cylinder 66.

As sh in FIGS. 3A and 3B, the pressure control valve 50 includes a seating valve 103 that includes a valve body 100 and a valve seat 102, and a coil 104 that generates electromagnetic force for controlling the relative position of the valve body 100 and the valve seat 102.

The pressure control valve 50 is a normally-open valve in which the valve body 100 is separated from the valve seat 102 by elastic force of a spring 106 in a non-operating state (off state) where the coil 104 is not excited.

In an operating state (on state) where the coil 104 is excited, the magnetic force F1 of the coil 104 acts in such a direction as to seat the valve body 100 onto the valve seat 102. The valve body 100 also receives a differential pressure force F2 based on the difference between the brake cylinder liquid pressure and the master cylinder liquid pressure, and the elastic force F3 of the spring 106, in a direction opposite to the direction of the magnetic force F1 of the coil 104. When the brake pedal 60 is in a non-operated state, the liquid pressure in the master cylinder equals an atmospheric pressure, so that the differential pressure has a magnitude corresponding to the brake cylinder liquid pressure.

Within a region where the attracting force F1 is greater than the differential pressure force F2 based on the brake cylinder liquid pressure so that the following expression holds:

$$F2 \leq F1 - F3,$$

the valve body 100 is seated on the valve seat 102, so that the operating liquid is prevented from flowing out of the brake cylinder 70. The liquid pressure in each brake cylinder 70 is increased due to supply of the high-pressure operating liquid into the brake cylinder 70 from the pump 84.

When the differential pressure force F2 increases as the brake cylinder liquid pressure increases so that the following expression holds:

$$F2 > F1 - F3,$$

the valve body 100 is separated from the valve seat 102. Then, the operating liquid is returned from the brake cylinders 70 to the master cylinder 66. If the elastic force F3 is ignored in the above expression, it means that the brake cylinder liquid pressure is controlled to a liquid pressure that is higher than the master cylinder liquid pressure by the amount of differential pressure based on the coil attracting force F1.

A design is provided such that the magnitude of the attracting force F1, that is, the magnetic force of the coil 104, linearly changes in accordance with the magnitude of an exciting current I through the coil 104.

If the supply current I to the pressure control valve 50 is controlled while the operating liquid pressure source 88 is in an operating state, the liquid pressure in each brake cylinder 70 is controlled. The supply current I can be feedback-controlled so that the brake liquid pressure detected by a pressure sensor 108 approaches a target liquid pressure. It is also possible to perform a feed-forward control instead of the feedback control. The brake 62 is operated by the operating fluid output from the operating liquid pressure source 88 so as to retard rotation of each wheel 69, even if the brake pedal 60 is not operated by an operating person. If there is a necessity to control the liquid pressure in the brake cylinder 70 of each wheel separately as in the antilock brake control, the vehicle behavior control, etc., the liquid pressure is controlled by the control of each of the individual liquid pressure control devices 74.

Operation of the running control apparatus constructed as described above will now be described.

The running control apparatus performs the cruise control. In the cruise control, the state of running of the vehicle is controlled so that the inter-vehicle distance between the vehicle and a preceeding vehicle is kept equal to an inter-vehicle distance corresponding to a selected inter-vehicle time as described above. However, if there is a necessity to decelerate the vehicle, a decelerating control is performed. In the decelerating control, the transmission 40 and the throttle control device 36 of the engine apparatus are controlled or the brake device 54 is controlled so that the actual deceleration $\alpha n$ approaches the target deceleration $\alpha^*n$. If the necessity to decelerate the vehicle is low, the throttle control device 36 and the transmission 40 are first controlled. If the necessity for deceleration is high and a brake operating condition is met, the control of the brake device 54 is added. That is, the control of the throttle control device 36 and the transmission 40 is assigned with a higher priority, so that the frequency of operation of the brake device 54 becomes relatively low.

Figure 4:
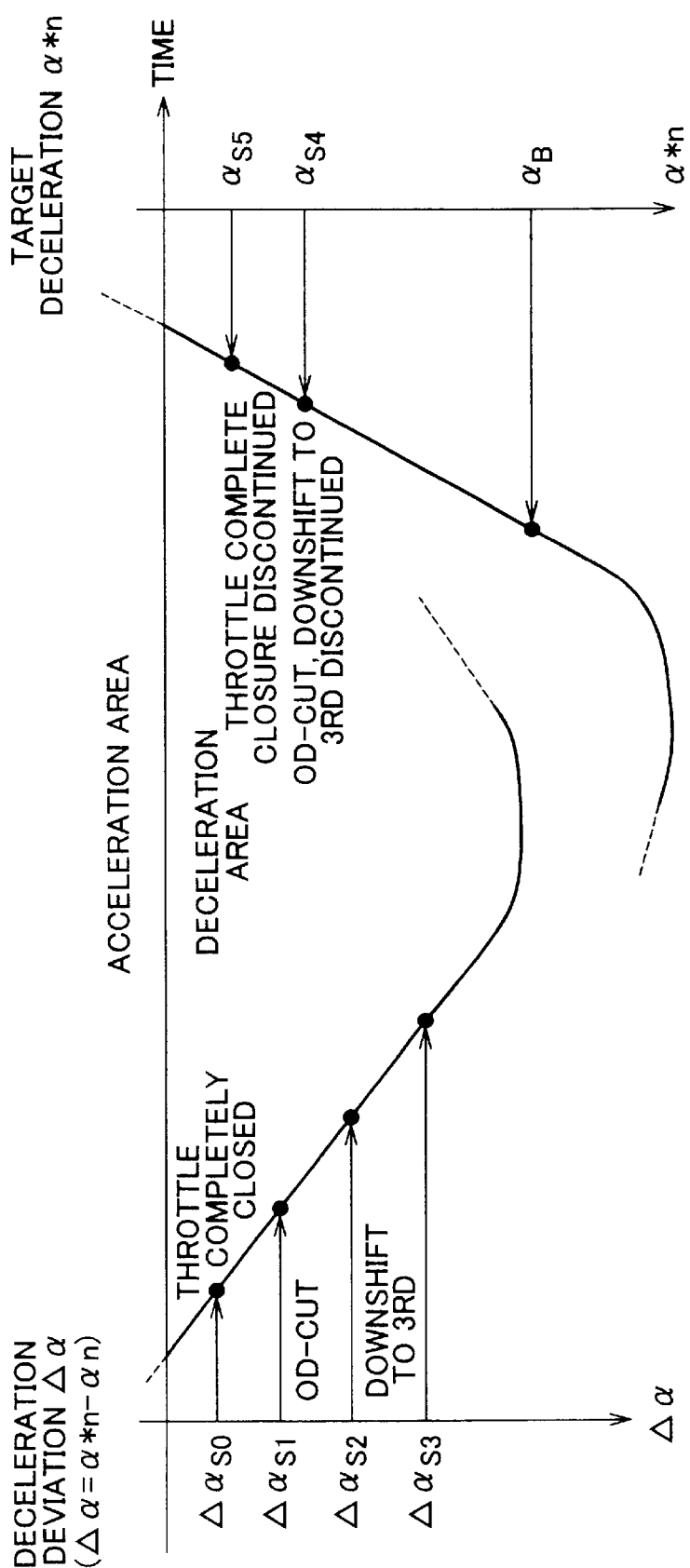
FIG. 4 is a diagram indicating a control performed by the running control apparatus.

An outline of the cruise control will be described with reference to FIG. 4. In this embodiment, the vehicle spacing control ECU 12 determines a target deceleration $\alpha^*n$ based on the requested inter-vehicle time T* selected by an operating person, the actual inter-vehicle time T (value obtained by dividing the inter-vehicle distance Z by the speed Vn of the vehicle), and the relative speed Vr. Then, a deceleration deviation $\Delta\alpha$ is determined by subtracting the actual deceleration $\alpha n$ from the target deceleration $\alpha^*n$. If the deceleration deviation $\Delta\alpha$ is greater than "0", it is understood that the actual deceleration $\alpha n$ is insufficient with respect to the target deceleration $\alpha^*n$ and therefore there is a necessity for deceleration (i.e., a necessity to increase the deceleration of the vehicle from the present level; a case where the vehicle is presently decelerating, and another case where the vehicle is accelerating or running at a constant speed.). Furthermore, it is understood that the necessity for deceleration is higher when the deceleration deviation $\Delta\alpha n$ is relatively great than when it is relatively small.

If the deceleration deviation $\Delta\alpha$ is greater than "0", the degree of throttle opening is reduced. More specifically, the throttle control device 36 feedback-controls the degree of throttle opening so that the actual deceleration $\alpha n$ approaches the target deceleration $\alpha^*n$. When the deceleration deviation $\Delta\alpha$ reaches at least a 0th threshold $\Delta\alpha s0$, the degree of throttle opening is set to "0" (completely closed). When the deceleration deviation $\Delta\alpha$ reaches at least a 1st threshold $\Delta\alpha s1$, the speed ratio is shifted d to the fourth speed. That is, the shifting of the speed ratio to the fifth speed is prohibited (overdrive-cut). Therefore, if the present speed ratio is the fifth speed, the speed ratio is shifted d to the fourth speed.

Then, when the deceleration deviation $\Delta\alpha$ reaches at least a 2nd threshold $\Delta\alpha s2$, the speed ratio is shifted d to the third speed. Furthermore, if the brake operating condition is met, the brake 62 is operated. If the brake operating condition is met, the operating liquid pressure source 88 in the brake device 54 is set to the operating state and electric current is supplied to the pressure control valve 50. A magnitude of the supply electric current to the pressure control valve 50 is determined such that a brake-purpose target deceleration $\alpha^*nB$ is reached. Normally, the brake-purpose target deceleration $\alpha^*nB$ is different from the aforementioned target deceleration $\alpha^*n$ as described below. The brake-purpose target deceleration a* nB is determined when the brake operating condition is met.

In contrast, if the inter-vehicle distance Z becomes smaller than the approach distance Dw, the alarm device 52 is operated. The approach distance Dw is determined as the sum of a first approach distance Dw1 determined based on the requested inter-vehicle time T*, the speed Vn of the vehicle and the relative speed Vr, a second approach distance Dw2 determined based on the actual deceleration $\alpha n$ of the vehicle, and a third approach distance Dw3 determined based on a relative deceleration $\alpha r$. That is, instead of determining the first approach distance Dw1 as an approach distance, a value corrected by the deceleration of the vehicle and the relative deceleration is determined as an approach distance.

Figure 5:
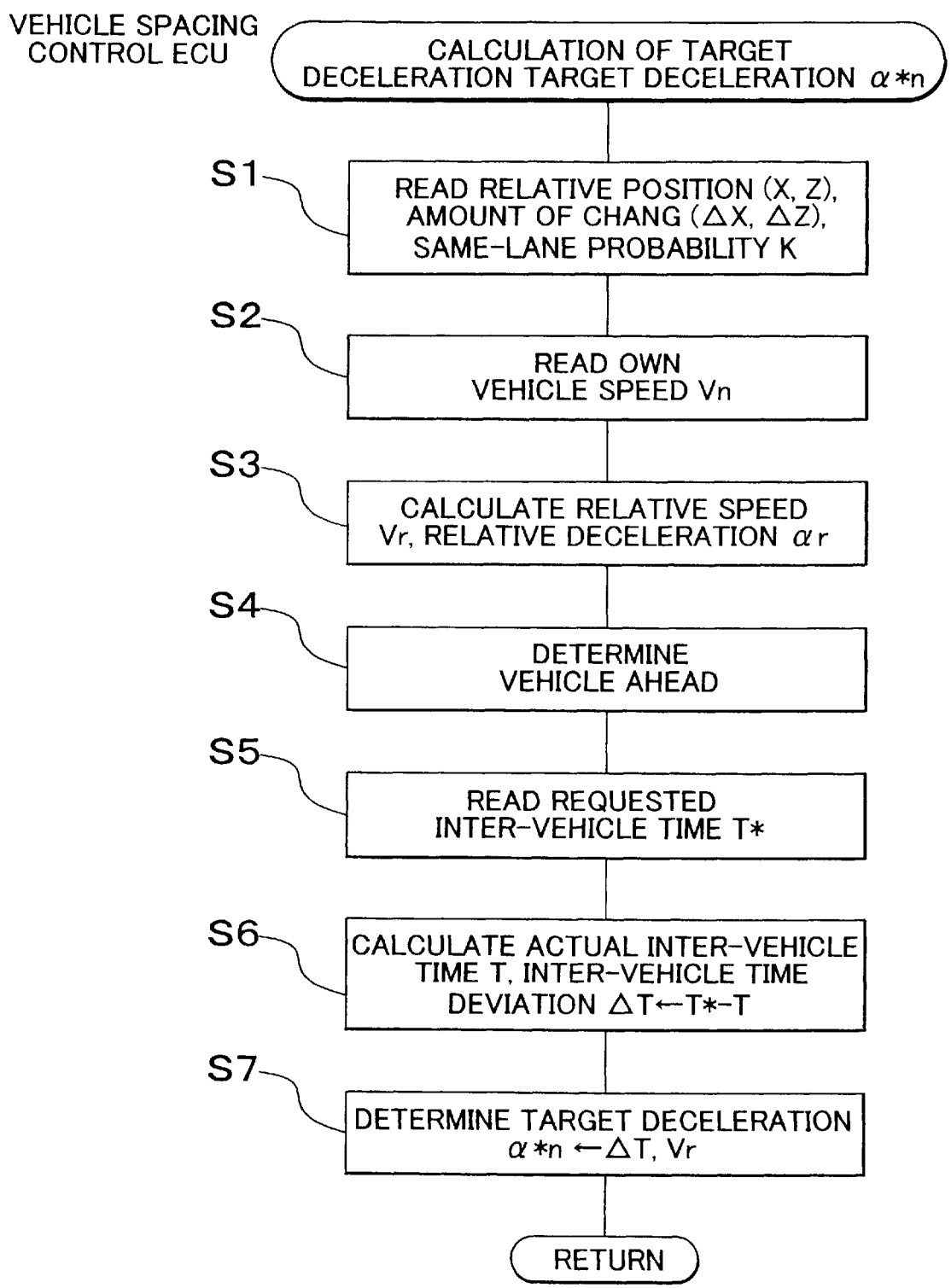
FIG. 5 is a flowchart illustrating a target deceleration determining program stored in a ROM of the vehicle spacing control ECU of the running control apparatus.

The vehicle spacing control ECU 12 executes a target deceleration determining program illustrated by the flowchart of FIG. 5, every time the vehicle spacing control ECU 12 receives information from the laser radar device 20. The laser radar device 20 transmits information to the vehicle spacing control ECU 12 at every predetermined communication timing. The running speed Vn of the vehicle and the like are transmitted from the engine ECU 14. It is practicable to adopt a construction in which the running speed Vn and the like are transmitted from the engine ECU 14 in accordance with vehicle speed request information from the vehicle spacing control ECU 12, or a construction in which the running speed Vn and the like are transmitted from the engine ECU 14 regardless of request information, and are stored in an input/output portion of the vehicle spacing control ECU 12. The communication between the engine ECU 14 and the brake ECU 16 is likewise performed.

In the vehicle spacing control ECU 12 or the like, a plurality of programs are concurrently executed in a time-divided manner.

In step 1 (hereinafter, simply referred to as "S1"; the other steps are likewise indicated), the relative position (X, Z) of an object body, the amount of change ($\Delta X$, $\Delta Z$) in the relative position, and the same-lane probability K are read. In S2, the speed Vn of the vehicle is read. Subsequently in S3, the relative speed Vr and the relative deceleration $\alpha r$ with respect to the object body are determined based on the amount of change ($\Delta X$, $\Delta Z$) in the relative position and the like. In S4, it is determined whether the object body is a preceeding vehicle. If it is determined that the object body is a body in a moving state, that is, a preceeding vehicle, a vehicleahead flag is set.

In step S5, the inter-vehicle time set by an operating person, that is, the requested inter-vehicle time T*, is read. In S6, an actual inter-vehicle time T (=inter-vehicle distance Z÷speed Vn of the vehicle) is determined, and an inter-vehicle time deviation $\Delta T$ (=T*−T) is determined.

In S7, a target deceleration is determined based on the inter-vehicle time deviation $\Delta T$ and the relative speed Vr. If the inter-vehicle time deviation $\Delta T$ is at least "0" and the requested inter-vehicle time is shorter than the actual inter-vehicle time, such a condition indicates that the actual inter-vehicle distance is insufficient with respect to the requested value. That is, there is a necessity for deceleration. The necessity for deceleration increases with increases in the inter-vehicle time deviation $\Delta T$. If the inter-vehicle time deviation $\Delta T$ is less than "0" and the actual inter-vehicle time is longer than the requested inter-vehicle time, such a condition indicates that the inter-vehicle distance is sufficient. That is, there is no necessity for deceleration, or there is a necessity for acceleration.

Figure 8:
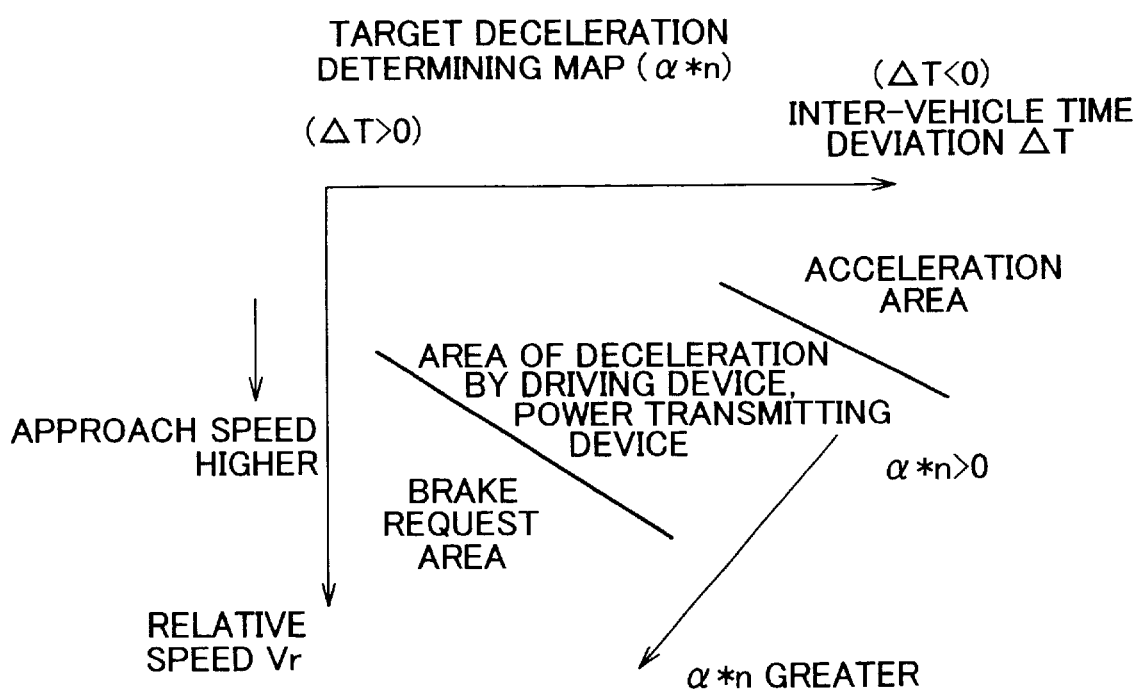
FIG. 8 is a map indicating a target deceleration determining table stored in the ROM of the vehicle spacing control ECU.

As indicated in a map sh in FIG. 8, provided that the inter-vehicle time deviation $\Delta T$ is at least "0", the target deceleration $\alpha^*n$ is increased as the absolute value of the inter-vehicle time deviation $\Delta T$ increases. If the inter-vehicle time deviation $\Delta T$ is less than "0", the target deceleration $\alpha^*n$ is reduced so that an acceleration area is eventually entered, as the absolute value of the inter-vehicle time deviation $\Delta T$. The target deceleration $\alpha^*n$ is set greater when the approaching speed, that is, a kind of the relative speed Vr, is relatively greater than when the approaching speed is relatively small. This is because the necessity for deceleration is higher when the approaching speed is relatively great than when it is relatively small.

The target deceleration may also be determined based on an inter-vehicle time deviation ratio ($\Delta T/T^*$) obtained by dividing the inter-vehicle time deviation by a requested inter-vehicle time, instead of the inter-vehicle time deviation $\Delta T$. It is also possible to use the inter-vehicle distance instead of the inter-vehicle time. Any value may be used so long as it is a value related to a deviation obtained by subtracting an actual relative positional relationship from a requested relative positional relationship that is a relative positional relationship with respect to the preceeding vehicle requested by the operating person, in other words, a value that indicates the necessity for deceleration. A target deceleration can be determined based on the deviation or a quantity related to the deviation, such as the ratio of the deviation or the like.

Figure 6:
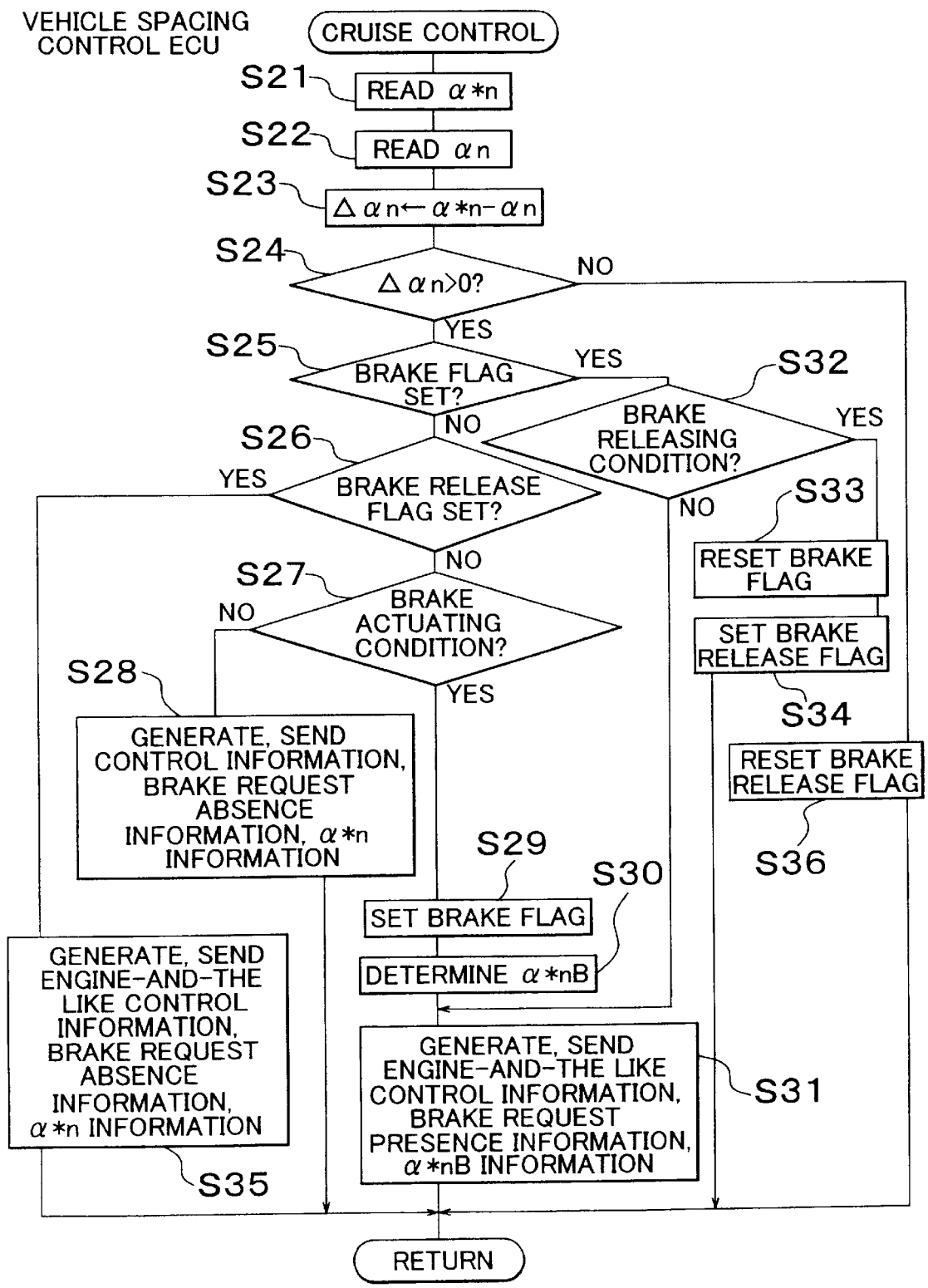
FIG. 6 is a flowchart illustrating a cruise control program stored in the ROM of the vehicle spacing control ECU.

A cruise control program illustrated by the flowchart of FIG. 6 is executed at preset time intervals. In steps S21 to S23, the target deceleration $\alpha^*n$ is read, the actual deceleration $\alpha n$ of the vehicle is read, and a deceleration deviation $\Delta\alpha n$ (=$\alpha^*n$−$\alpha n$) is determined as a difference therebetween.

In step S24, it is determined whether the deceleration deviation $\Delta\alpha n$ is greater than "0". If the deceleration deviation $\Delta\alpha n$ is greater than "0", the decelerating control is executed. If the deceleration deviation $\Delta\alpha n$ is at most "0", an accelerating control is executed.

In step S25, it is determined whether a brake flag is in a set state. In step S26, it is determined whether a brake release flag is in a set state. If each flag is in a reset state, it is determined in step S27 whether the brake operating (actuating) condition is met. If the brake operating condition is not met, the process proceeds to step S28, in which information for control of the engine or the like is created and brake request absence information indicating that there is no necessity for a brake request is created. Furthermore in step S28, the thus-created information as well as information indicating the target deceleration $\alpha^*n$ is transmitted to the engine ECU 14.

If the deceleration deviation $\Delta\alpha n$ is smaller than the 0th threshold $\Delta\alpha s0$ as mentioned above, a throttle opening control command is created. If the deceleration deviation $\Delta\alpha n$ is greater than the 0th threshold $\Delta\alpha s0$, a throttle complete closure command is created. If the deceleration deviation $\Delta\alpha n$ is greater than the 1st threshold $\Delta\alpha s1$, an overdrive-cut command and the throttle complete closure command are generated. If the deceleration deviation $\Delta\alpha n$ is greater than the 2nd threshold $\Delta\alpha s2$, a dshift-to-3rd speed command and the throttle complete closure command are created. Then the information for control of the engine or the like (a throttle control command, a speed ratio control command) as well as the information indicating the target deceleration $\alpha^*n$ and the brake request absence information is transmitted to the engine ECU 14.

Conversely, if the brake operating condition is met, the process from step S29 is started. There are four brake operating conditions: (a) the deceleration deviation $\Delta\alpha n$ is greater than the 3rd threshold $\Delta\alpha s3$; (b) the object body is a preceeding vehicle ahead of the vehicle; (c) the same-lane probability is at least a set probability; and (d) the inter-vehicle distance is less than a set distance. If all four of the conditions are met, the brake operating condition is supposed to be met. The set distance in the condition (d) is a value that allows reliable detection of the presence/absence of an object body and that is determined by the performance capabilities of the laser radar device 20. If the brake operating condition is met, it is indicated that the degree of necessity to decelerate the vehicle is high. That is, the actual deceleration is insufficient with respect to the target deceleration, and the vehicle running ahead of the vehicle in the same lane is detected with high probability. The conditions (b) to (d) can be combined into a pre-condition for starting the brake.

Thus, the brake 62 is operated when it is determined that the necessity of the brake operation is high. Therefore unnecessary operation of the brake can be avoided.

If a plurality of object bodies are detected by the laser radar device 20 and information indicating relative positions of the individual object bodies is transmitted, a vehicle that is the closest to the vehicle among the preceding vehicles of the plurality of the detected object bodies is set as an object vehicle. A relative positional relationship with respect to the object vehicle, such as the inter-vehicle distance, the relative speed, the relative deceleration, etc. is determined. Furthermore, it is determined whether the same-lane probability K is equal to or greater than a set probability Ks.

In step S29, the brake flag is set. In step S30, a target deceleration $\alpha^*nB$ in the brake control is determined. Subsequently in step S31, brake request presence information and control information are prepared, and are transmitted to the engine ECU 14 together with information indicating the brake-purpose target deceleration $\alpha^*nB$. If the brake is in operation, the control information normally indicates the dshift-to-third speed command or the throttle complete closure command.

Figure 9:
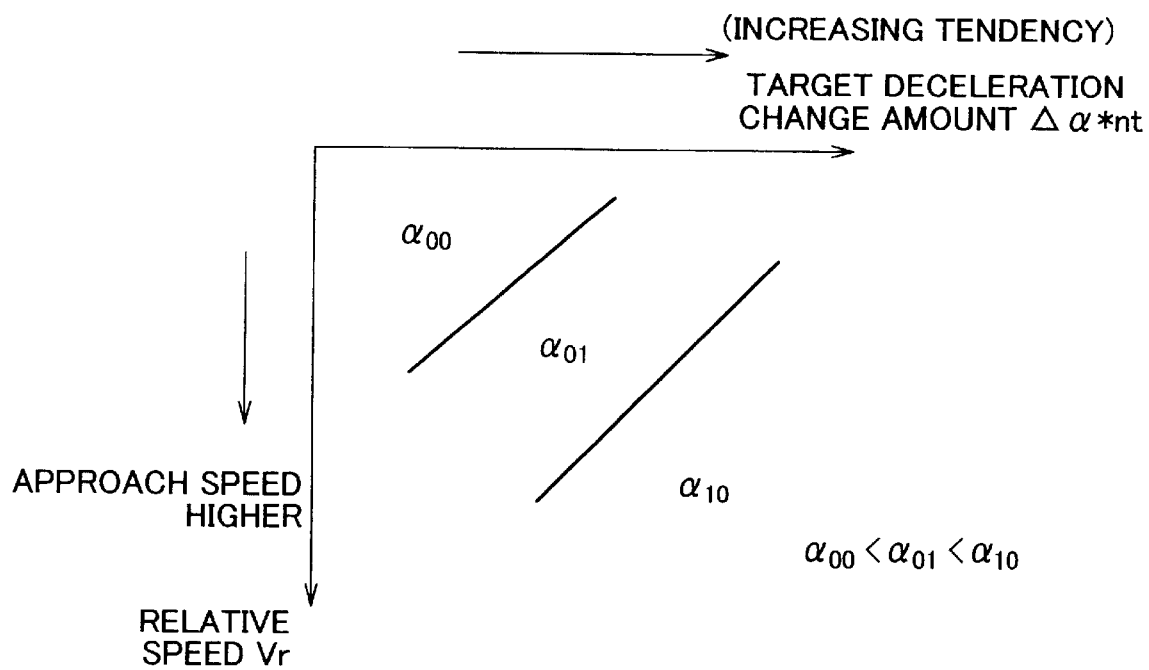
FIG. 9 is a map indicating a brake-purpose target deceleration determining table stored in the ROM of the vehicle spacing control ECU.

The brake-purpose target deceleration is determined in accordance with a brake-purpose target deceleration determining table indicated by a map of FIG. 9. The brake-purpose target deceleration $\alpha^*nB$ is determined based on the amount of change $\Delta\alpha^*nt$ in the target deceleration $\alpha^*n$ with respect to time (hereinafter, referred to as "target deceleration change amount") and the relative speed Vr occurring when the brake operating condition is met. If the target deceleration change amount $\Delta\alpha^*nt$ is a positive value, it is indicated that the target deceleration $\alpha^*n$ tends to increase, and the necessity for deceleration tends to increase. Conversely, if the target deceleration change amount $\Delta\alpha^*nt$ is a negative value, the target deceleration $\alpha^*n$ tends to decrease, and the necessity for deceleration tends to decrease. Thus, according to the target deceleration change amount $\Delta\alpha^*nt$, the necessity for deceleration can be predicted. Based on the target deceleration change amount $\Delta\alpha^*nt$, it means that brake-purpose target deceleration $\alpha^*nB$ is determined on the basis of the predicted value of the necessity for deceleration.

If the target deceleration change amount $\Delta\alpha^*nt$ is a positive value, the brake-purpose target deceleration $\alpha^*nB$ is increased with increases in the absolute value of the target deceleration change amount $\Delta\alpha^*nt$. Furthermore, the brake-purpose target deceleration $\alpha^*nB$ is increased as the approaching speed increases.

The brake operating condition is not limited to the aforementioned conditions. For example, in addition to the aforementioned conditions, it is possible to adopt at least one of the following conditions that: (e) the dshift-to-third speed command has been generated; (f) the accelerating control is not requested (the deceleration deviation $\Delta\alpha n$ is greater than "0"); (g) the throttle complete closure command has been generated; (h) the accelerator pedal is not operated; (i) none of the antilock brake control, the vehicle behavior control, etc., is being performed; etc.

It is a normal operation to decelerate the vehicle by controlling the engine or the like before the brake 62 is actuated. However, with respect to the throttle control device 36 or the transmission 40, a predetermined control is performed as mentioned above, which is adopted as a condition. Furthermore, with regard to the brake device 54 as well, a condition that the brake device 54 is in a state that allows automatic braking in accordance with the cruise control is adopted as a condition.

If the brake control is being executed, it is determined in step S32 whether a brake releasing condition is met. If the brake releasing condition is not met, the brake control is continued. Subsequently, step S31 is executed. In this case, the value of the brake-purpose target deceleration $\alpha^*nB$ is the same as the value in the previous cycle. Thus, in this embodiment, after the brake operating condition is met, the same value of the brake-purpose target deceleration $\alpha^*nB$ is maintained until the corresponding brake operation ends. However, since the brake-purpose target deceleration $\alpha^*nB$ is determined based on a predicted value of the necessity for deceleration as described above, an undesired event is avoided in which the value of the brake-purpose target deceleration $\alpha^*nB$ immediately becomes a value that is remarkably inappropriate with respect to the relative positional relationship between the vehicle and the object body.

It is possible to adopt a construction in which during operation of the brake 62, the brake-purpose target deceleration $\alpha^*nB$ is changed. For example, in some cases, it is desirable to change the brake-purpose target deceleration $\alpha^*nB$ if the target deceleration $\alpha^*n$ has been changed from the value provided at the time of start of the brake operation by at least a set amount. It is also possible to change the brake-purpose target deceleration $\alpha^*nB$ if there is a change of at least a set amount in the relative positional relationship between the vehicle and the object body, such as the inter-vehicle time, the inter-vehicle distance, etc., as well as the target deceleration $\alpha^*n$. Furthermore, during brake operation, the brake-purpose target deceleration $\alpha^*nB$ may be suitably changed to a value determined in accordance with a map prepared based on the target deceleration change amount $\Delta\alpha^*nt$ and the relative speed Vr. If determined in accordance with the map, the brake-purpose target deceleration $\alpha^*nB$ is not continuously changed in accordance with continuous changes in the target deceleration change amount $\Delta\alpha^*nt$ or the relative speed Vr, but is changed discretely. Therefore, the frequency of changes in the brake-purpose target deceleration $\alpha^*nB$ can be reduced, in comparison with a case where the brake-purpose target deceleration $\alpha^*nB$ is continuously changed.

The brake releasing condition may be at least one of conditions that: (a) the target deceleration $\alpha^*n$ has become smaller than a brake release threshold $\alpha B$; (b) detection of the preceding vehicle discontinues; (c) the deceleration via the brake device 54 has become unnecessary (the dshift-to-third speed command is not generated, the accelerator pedal has been depressed, or the accelerating control command has been generated); (d) the brake device 54 has entered a state in which continuation of the cruise control is inappropriate (a system abnormality has been detected, the antilock brake control or the vehicle behavior control has been started, or the time of continuous operation of the brake has become equal to or longer than a set time).

In some cases, the deceleration deviation $\Delta\alpha n$ becomes less than the 2nd threshold $\Delta\alpha s2$ before the target deceleration $\alpha^*n$ becomes smaller than the brake release threshold $\alpha B$. If the dshift-to-third speed command has been cancelled, it may be considered that the deceleration via the brake 62 has become unnecessary. Thus, it is determined whether the brake releasing condition is met based on the state of detection of a preceeding vehicle, the state of control of the engine or the like, the state of operation of the brake device 54, etc. If the brake releasing condition is met, the brake flag is reset in S33, and the brake release flag is set in step S34.

If the brake releasing condition is set, the determination in step S26 becomes affirmative ("YES"). Subsequently in step S35, the engine-and-the like control command and the like are generated. If in this case, the target deceleration $\alpha^*n$ is smaller than the 4th threshold $\alpha s4$ as indicated in FIG. 4, information for discontinuing the restriction of the transmission speed ratio (speed-ratio normal control permission command) is generated, and is transmitted to the engine ECU 14 together with the brake request absence information, and information indicating the target deceleration $\alpha^*n$. If the target deceleration $\alpha^*n$ is smaller than the 5th threshold $\alpha s5$, information for discontinuing the complete closure of the throttle (throttle control command) is generated.

Thus, in this embodiment, the control of the throttle control device 36 and the transmission 40 performed before the application of the brake is different from the control thereof performed after release of the brake.

Furthermore, if the deceleration deviation $\Delta\alpha n$ becomes greater than "0", the determination in step S24 becomes negative ("NO"). Subsequently in step S36, the brake release flag is reset.

The tables as indicated by the maps of FIGS. 8 and 9 are not limited to those described in conjunction with this embodiment. For example, the maps are not limited to two-dimensional maps, but may also be maps of three or more dimensions. In that case, it is possible to adopt a construction in which, for example, the inter-vehicle distance is taken into account. The maps do not need to be of a fixed type, but may also be changed in accordance with learning. For example, it is possible to adopt a construction in which a threshold or a map value is changed based on the frequency of selection, the time of continuation of the same value setting, etc. As a result, it becomes possible to change a map in accordance with an operating person's preference regarding deceleration.

Figure 7:
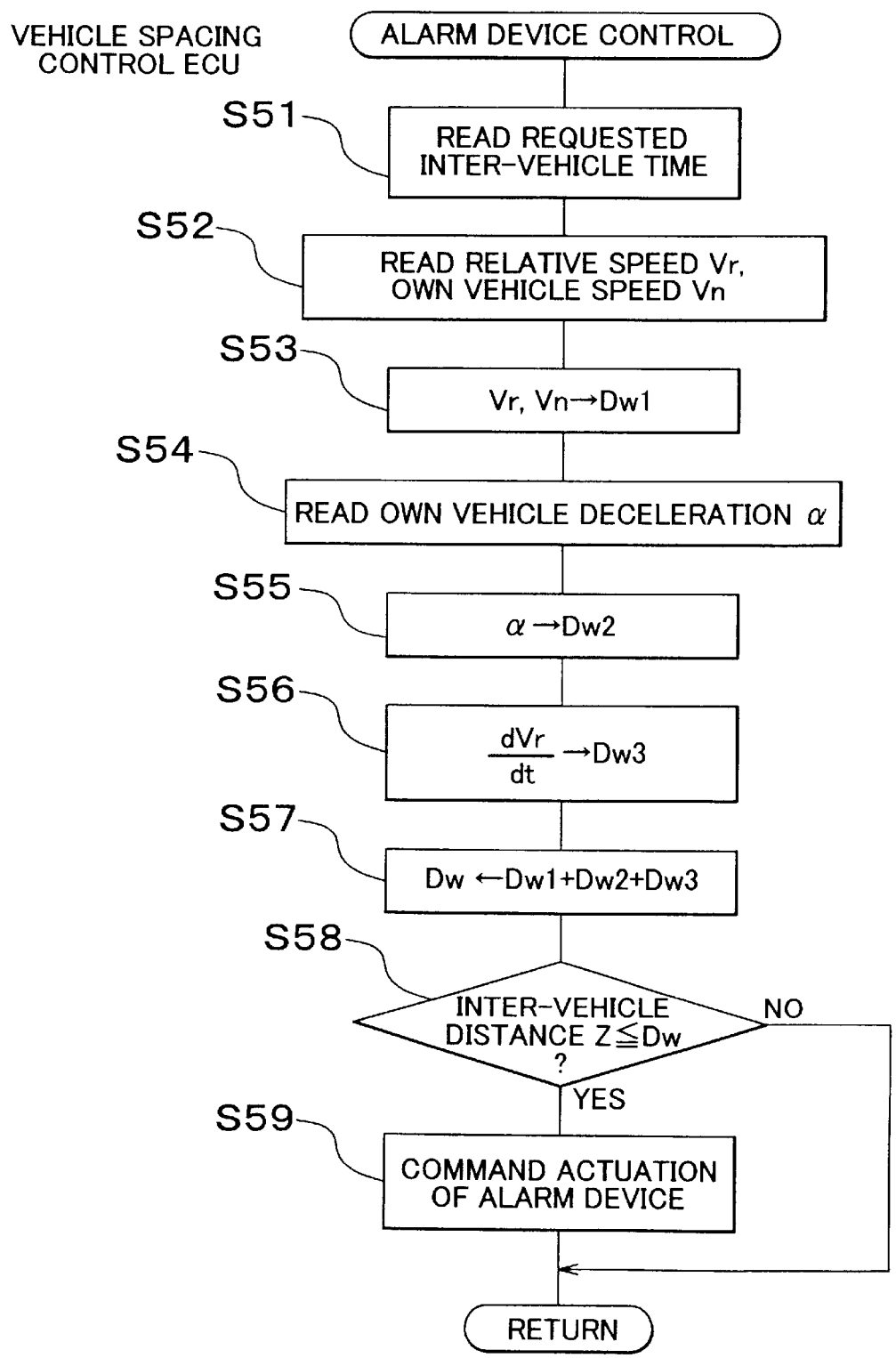
FIG. 7 is a flowchart illustrating an alarm device control program stored in the ROM of the vehicle spacing control ECU.

An alarm device control program illustrated by the flowchart of FIG. 7 is executed at preset time intervals.

Figure 10:
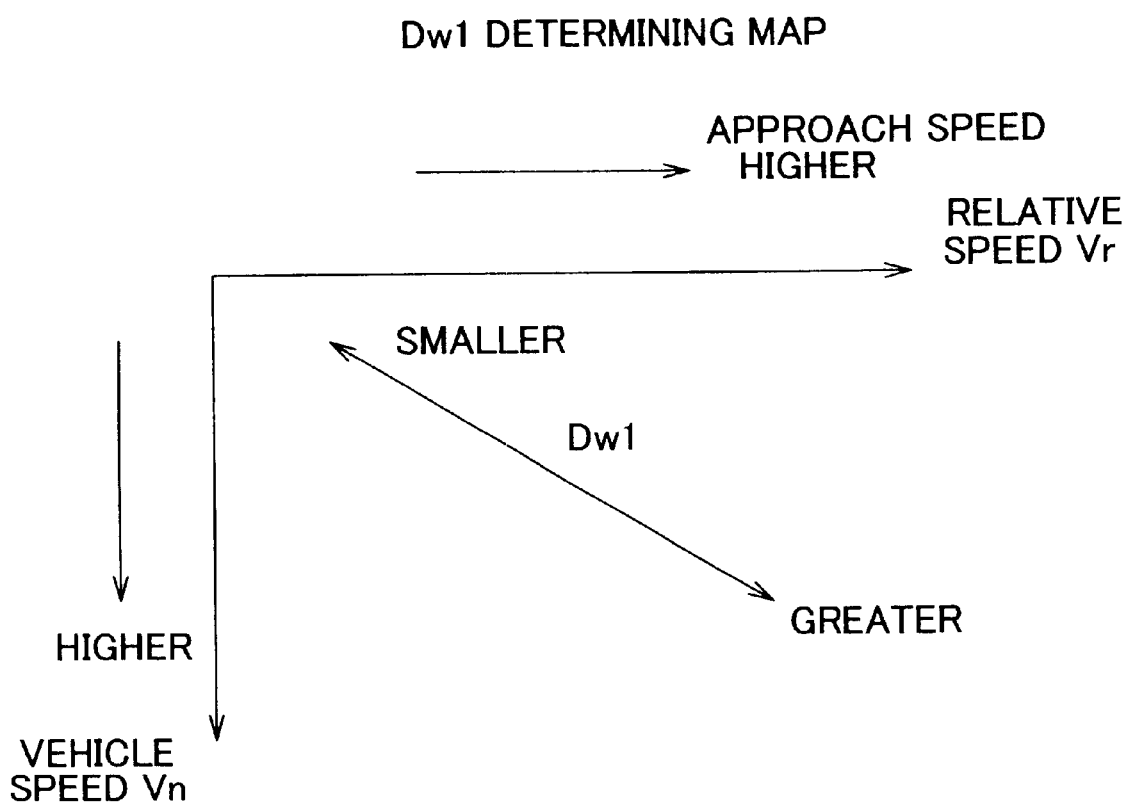
FIG. 10 is a map indicating a first approach distance determining table stored in the ROM of the vehicle spacing control ECU.

In S51 to S53, a first approach distance Dw1 is determined based on the requested inter-vehicle time T*, the relative speed Vr, and the speed Vn of the vehicle, in accordance with a first approach distance determining table represented by a map sh in FIG. 10. In this case, tables are provided separately for the individual requested inter-vehicle times T*. Therefore, a table corresponding to the present requested inter-vehicle time T* is selected. Using the selected table, a first approach distance Dw1 is determined based on the relative speed Vr and the speed Vn of the vehicle. The approach distance is increased with increases in the relative speed Vr and with increases in the speed Vn of the vehicle. The approach distance is also increased with increases in the requested inter-vehicle time T*.

Figure 11:
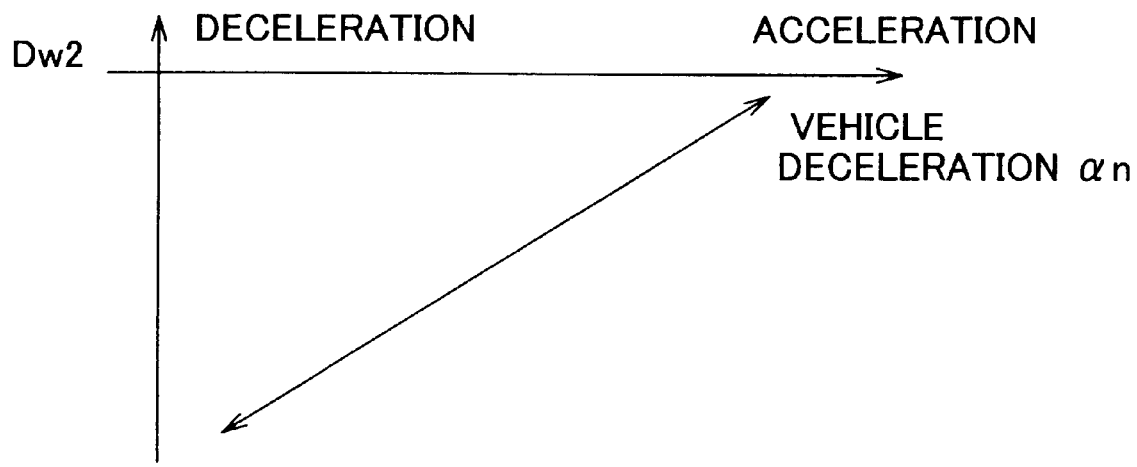
FIG. 11 is a map indicating a second approach distance determining table stored in the ROM of the vehicle spacing control ECU.

Next, in steps S54 to S55, a second approach distance Dw2 is determined based on the deceleration αn of the vehicle. The second approach distance Dw2 is determined in accordance with a second approach distance determining table represented by a map sh in FIG. 11. The second approach distance Dw2 is decreased (negative values having great absolute values) with increases in the deceleration αn of the vehicle. If the deceleration αn of the vehicle is great, an operating person feels safe. In such a case, therefore, the approach distance Dw is reduced so as to delay the alarm actuation timing.

Figure 12:
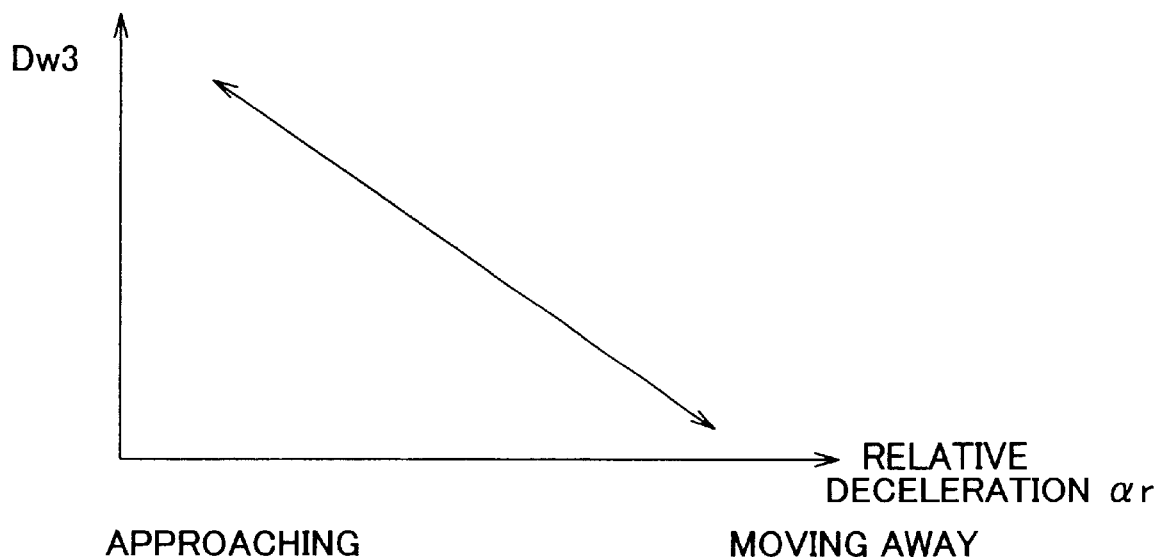
FIG. 12 is a map indicating a third approach distance determining table stored in the ROM of the vehicle spacing control ECU.

In S56, a third approach distance Dw3 is determined based on the relative deceleration αr (dVr/dt) in accordance with a third approach distance determining table represented by a map sh in FIG. 12. The third approach distance Dw3 is set smaller when there is a strong separating tendency than when there is a strong approaching tendency. If there is a strong separating tendency, that is, if the relative deceleration αr is great, the approach distance is reduced to delay the alarm actuation timing, in comparison with a case where the relative deceleration αr is small.

In S57, the approach distance Dw is determined as the sum of the first to third approach distances (Dw1+Dw2+Dw3). In S58, it is determined whether the present inter-vehicle distance Z is less than or equal to the approach distance Dw. If the present inter-vehicle distance Z is greater than the approach distance Dw, the alarm device 52 is not actuated. If the present inter-vehicle distance Z is less than or equal to the approach distance Dw, information indicating a command to actuate the alarm device 52 is generated, and is transmitted to the engine ECU 14 in step S59.

Thus, the approach distance at which the alarm device 52 is actuated is determined as a value corrected based on the deceleration αn of the vehicle and the relative deceleration αr. Since the value of approach distance is determined taking into account the security feeling of an operating person caused by deceleration and the actual state of approach, an uncomfortable feeling of an operating person caused by occurrence of an alarm can be reduced.

In this embodiment, regardless of whether an object body is in a resting state or a moving state (vehicle ahead), an alarm device actuation command is generated if the inter-vehicle distance Z becomes equal to or less than the approach distance.

The maps for use in determining the approach distance are not limited to those described above in conjunction with this embodiment. As is the case with the maps sh in FIGS. 8 and 9, it is possible to adopt multi-dimensional maps, or to change maps in accordance with learning. The approach distance may be increased, for example, if a system abnormality is detected. For example, the approach distance is increased if the actual deceleration is less by at least a set value than a deceleration expected to be reached due to the cruise control (target deceleration).

The approach distance Dw may also be determined by multiplying the first approach distance Dw1 by a deceleration correction value determined based on the deceleration of the vehicle, a relative deceleration correction value determined based on the relative deceleration, etc. The deceleration correction value is decreased with increases in the deceleration of the vehicle. The relative deceleration correction value is decreased with increases in the relative deceleration.

Figure 13:
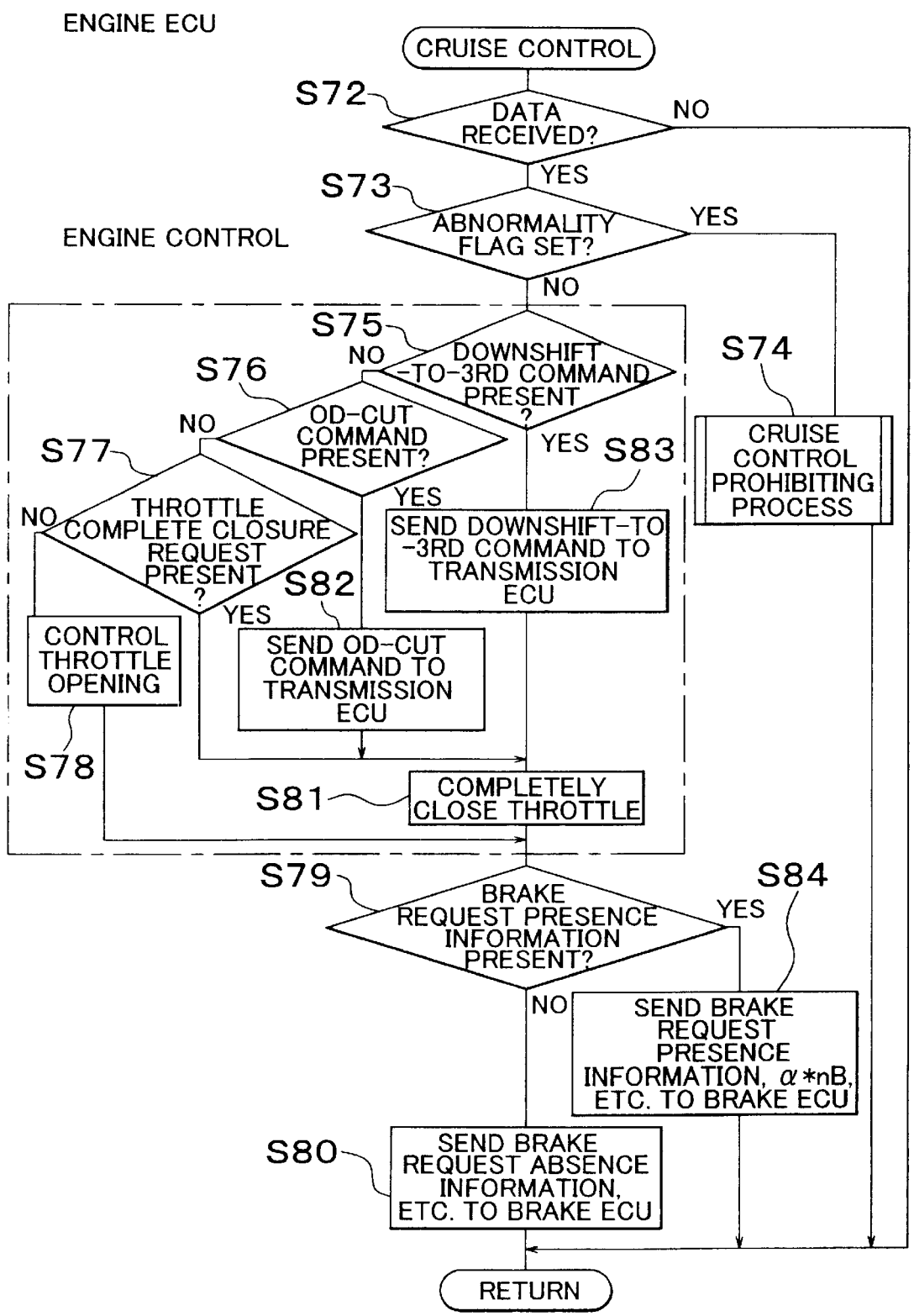
FIG. 13 is a flowchart illustrating a cruise control program stored in a ROM of an engine ECU sh in FIG. 1.

The engine ECU 14 executes a cruise control program illustrated by the flowchart of FIG. 13, at preset time intervals. A time taken for transmission of information from the vehicle spacing control ECU 12 may be set as the set time. It is also practicable for the engine ECU 14 to execute the program every time information is received from the vehicle spacing control ECU 12.

In step S72, it is detected whether information has been received from the vehicle spacing control ECU 12. If information has been received from the vehicle spacing control ECU 12, it is determined in S73 whether an abnormality flag is in a set state. If the abnormality flag (to be described later) is in the set state, the cruise control is prohibited in step S74. That is, a predetermined cruise control prohibiting process is performed.

If the abnormality flag is in a reset state, the engine or the like is controlled in accordance with the engine control information in a process starting at step S75. In this embodiment, control of the engine or the like is performed in every execution of the cruise control. The control prior to the start of the brake actuation will be described herein, and the control subsequent to the release of the brake will not be described. Subsequent to the brake release, a control is performed in accordance with a speed ratio normal control permission command, a throttle control command, etc.

In steps S75 to S77, the engine ECU 14 determines whether the dshift-to-third speed command is present, whether the overdrive-cut command is present, and whether the throttle complete closure command is present, respectively. If all the determinations are negative ("NO"), the process proceeds to step S78, in which the degree of throttle opening is controlled by control of the throttle control device 36 so as to achieve the target deceleration α*n without controlling the transmission speed ratio. A degree of throttle opening that will achieve the target deceleration α*n is determined. A command value corresponding to the degree of throttle opening is output to the throttle control device 36. In step S79, it is determined whether the information received contains the brake request presence information. If the brake request presence information is not present, the process proceeds to step S80, in which predetermined information (brake control information, information for use in detection of an abnormality described below), such as the brake request absence information or the like, is transmitted to the brake ECU 16.

If the throttle complete closure command is present, the degree of throttle opening is set to "0" in step S81. In this case, the brake request presence information is usually not present (NO in S79). The process then proceeds to step S80 in which the brake request absence information and the like is transmitted to the brake ECU 16. If the overdrive-cut command is present, the overdrive-cut command is transmitted to the transmission ECU 34 in step S82. Subsequently in step S81, the degree of throttle opening is set to "0". Then in step S80, the brake request absence information and the like is transmitted. If the dshift-to-third speed command is present, the dshift-to-third speed command is transmitted to the transmission ECU 34 in step S83. Subsequently in step S81, the degree of throttle opening is set to "0". If the brake request presence information is not present, predetermined information is transmitted to the brake ECU 16 in step S80 as in the aforementioned case.

Conversely, if the brake request presence information is present, the determination in step S79 is affirmative ("YES"). Subsequently in step S84, predetermined information such as the brake request presence information, information indicating the brake-purpose target deceleration α*nB, etc., is transmitted to the brake ECU 16.

Figure 14:
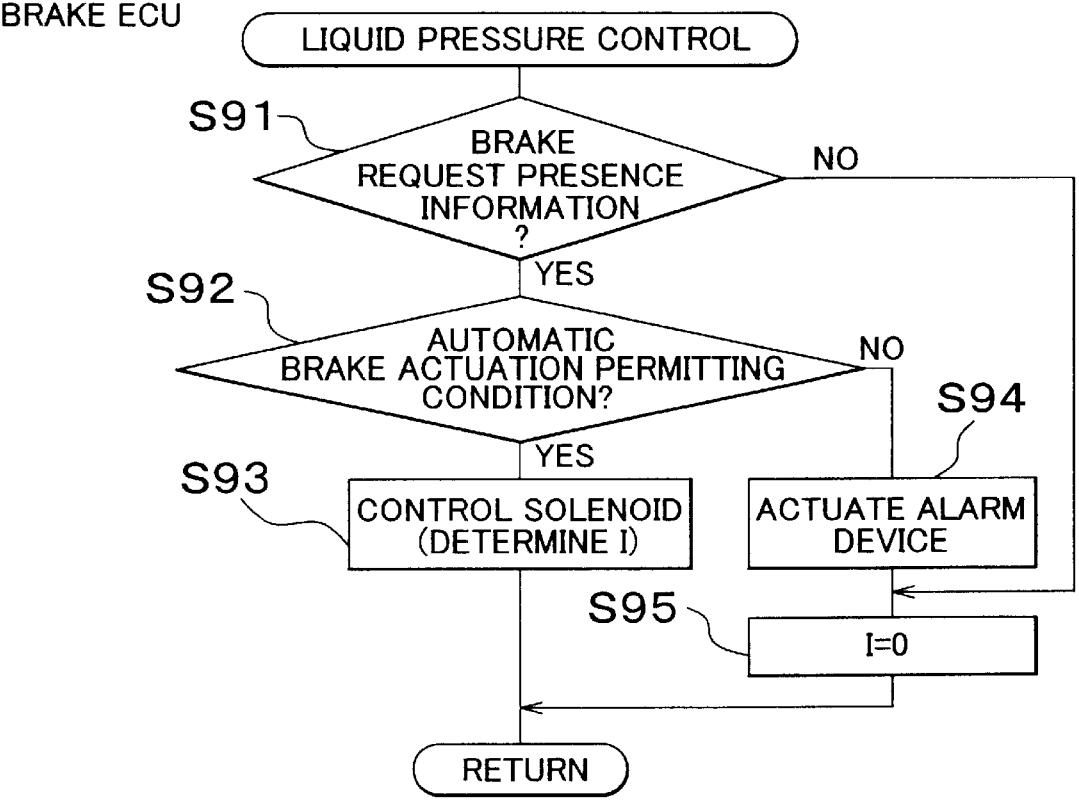
FIG. 14 is a flowchart illustrating a liquid pressure control program stored in the ROM of a brake ECU sh in FIG. 1.

The brake ECU 16 executes a brake operating force (liquid pressure) control program illustrated by the flowchart of FIG. 14, at preset time intervals.

In step S91, it is determined whether the brake request presence information has been received. In step S92, it is determined whether an automatic brake actuation permitting condition is met. The automatic brake actuation permitting condition is met if: (a) the temperature of a solenoid of the pressure control valve 50 is lower than a set temperature; or (b) the slip state of each wheel is on a stable side of a set state. If the automatic brake actuation incurs a danger of degradation of running stability of the vehicle, the automatic brake actuation is prohibited. The automatic brake actuation is also prohibited if the brake device 54 is in a state where continuation of application of the brake is not desirable.

If the automatic brake actuation permitting condition is met, the process proceeds to step S93, in which a supply current I to the coil 104 of the pressure control valve 50 is determined so as to achieve the brake-purpose target deceleration $\alpha*nB$, and the brake liquid pressure is controlled to a magnitude corresponding to the supply current I. The brake-purpose target deceleration $\alpha*nB$ remains fixed during one performance of the automatic braking as mentioned above.

Figure 16:
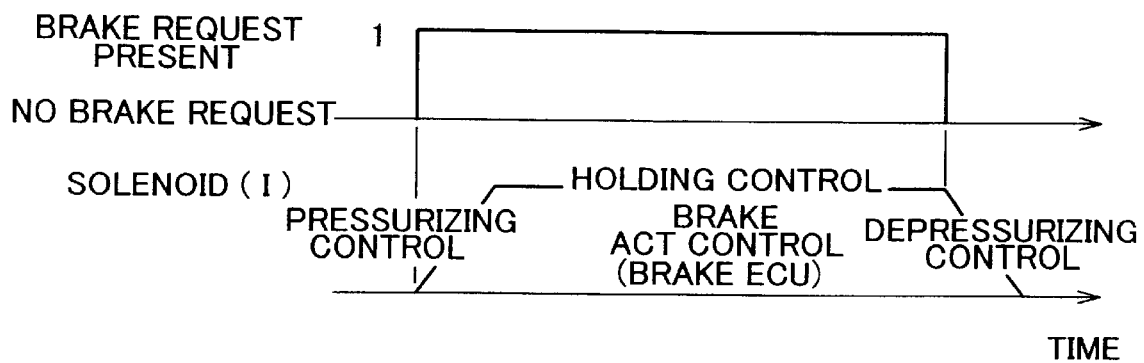
FIG. 16 is a diagram indicating a control performed by the brake ECU.

As indicated in FIG. 16, the supply current I to the pressure control valve 50 is kept fixed, and the brake liquid pressure is held at a value corresponding to the supply current I. If the brake-purpose target deceleration $\alpha*nB$ is constant, the supply current I is increased, held and decreased in accordance with a predetermined pattern (e.g., in a trapezoidal pattern indicated in FIG. 16). Thus, if the brake-purpose target deceleration $\alpha*nB$ is kept fixed, the brake control can be stably performed, so that control hunting can be reduced.

Furthermore, since the frequency of changes in the deceleration is reduced compared with that of the conventional system, the uncomfortable feeling that an operator may have can be reduced. Still further, since the change in the deceleration is reduced, the running stability of the vehicle can be improved, so the security feeling of an operator can be enhanced.

If the target deceleration is kept constant, it is assumed that the supply current I to the pressure control valve 50 will also be kept constant, and the brake liquid pressure will reach a pressure corresponding to the supply electric current I. Therefore, based on such circumstances, it is possible to easily detect an abnormality of the brake device 54.

Furthermore, if the target deceleration is changed, it becomes difficult to set a guard value of the control command value (electric current value I) to the pressure control valve 50. However, if the target deceleration is fixed, a guard value can be easily set.

If the automatic brake actuation permitting condition is not met, the alarm device 52 is actuated in step S94, and the supply electric current I to the coil 104 is set to "0" in step S95. Thus, the control of the brake liquid pressure is not performed. The supply current to the coil 104 is also set to "0" if the brake request absence information is present.

Figure 15:
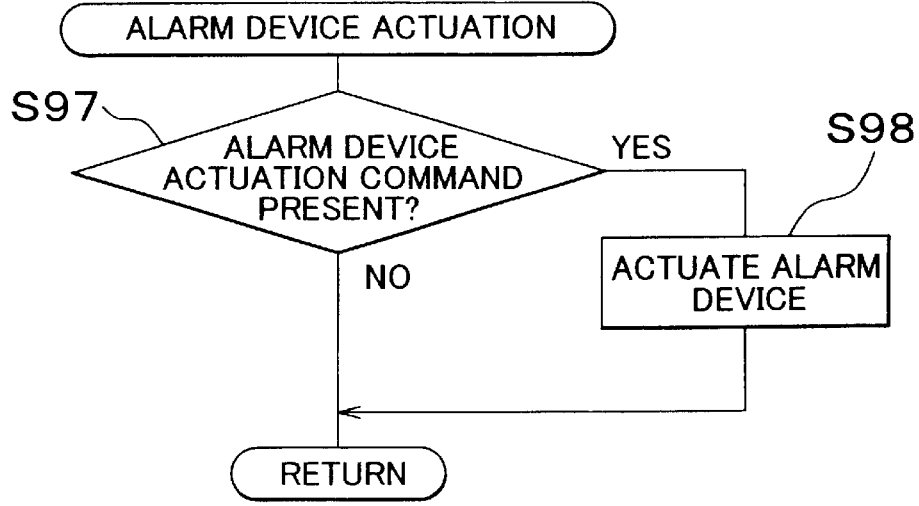
FIG. 15 is a flowchart illustrating an alarm device actuating program stored in the ROM of the brake ECU.

The brake ECU 16 also executes an alarm device actuating program illustrated by the flowchart of FIG. 15, at preset time intervals. In step S97, it is determined whether an alarm device actuation command has been received. If the command has been received, the alarm device 52 is actuated in step S98. That is, the alarm device 52 is actuated since the inter-vehicle distance Z has decreased to or below the approach distance Dw. In this case, the alarm device 52 produces an alarm at a timing determined based on the deceleration of the vehicle and the actual state of approach to the object body, so that the uncomfortable feeling of an operator caused by the alarm can be reduced. The alarm device 52 is actuated independently of the operating state of the brake.

During application of the brake, the target deceleration is kept constant, as mentioned above. However, if during application of the brake, the deceleration of the vehicle becomes insufficient and the actual inter-vehicle distance with respect to the preceding vehicle becomes short, an alarm is produced. Therefore, an operating person is prompted to perform a necessary operation, for example, depress the brake pedal 60 or the like. Thus, it is effective to perform the control of the alarm device 52 and the control of maintaining a constant target deceleration during application of the brake in a combined manner.

It is also possible to actuate the alarm device 52 by an interrupting operation. That is, upon reception of the alarm device actuation command, step S98 is immediately executed.

In this embodiment, the laser radar device 20 functions as a same-lane probability acquiring device. The vehicle spacing control ECU 16, the engine ECU 14, the transmission ECU 34, the throttle control device 36, and the brake ECU 14, the brake control actuator 50, etc., functions as a decelerating device or braking system. Furthermore, a portion of the brake ECU 16 that stores S92, a portion thereof that executes step S92, etc. function as a brake actuation permission/prohibition device.

A portion of the vehicle spacing ECU 12 that stores step S30, a portion thereof that executes step S30, etc., function as a target deceleration determining device. A portion of the brake ECU 16 that executes step S93, the brake control actuator 50, etc., function as a deceleration control device. In this embodiment, the deceleration control device corresponds to a brake control device.

A portion of the vehicle spacing control ECU 12 that stores steps S51 to S53, a portion thereof that executes steps S51 to S53, a portion thereof that stores the table indicated by the map of FIG. 10, etc. function as a provisional set distance determining portion. A portion that stores steps S54 to S57, a portion that executes those steps, a portion that stores the tables indicated by the maps of FIGS. 11 and 12, etc. function as a definitive set distance determining portion.

Next described will be detection of an abnormality. Abnormalities in the system include abnormalities of various component elements of the system, communication abnormalities, control abnormalities, etc. If any of such abnormalities is detected, the cruise control operation is prohibited. The abnormalities of component elements are, for example, abnormalities in various sensors, the throttle opening control actuator, the brake control actuator, the transmission, etc. These abnormalities can be detected at the time of an initial check and the like. The initial check is not described herein.

The communication abnormalities are, for example: (a) an abnormality that the information reception time interval is not a predetermined time interval, (b) an abnormality that if information with a continuity is contained in the received information, the continuity is not secured, (c) an abnormality that in a mirror check of the received information, information and inverted information are not in a relationship of inversion, etc.

The control abnormalities can be caused by mis-operations or non-operations of computers, control actuators and the like, communication mutations, etc. In this embodiment, a control abnormality is detected based on whether contents of two or more pieces of information have a logical consistency (logical abnormality).

At least one of such two or more pieces of information may be a piece of control information (e.g., engine-and-the like control information, information indicating the presence/absence of a brake request, information indicating a target deceleration, etc.). This is because both the engine ECU 14 and the brake ECU 16 are operated in accordance with control information from the vehicle spacing control ECU 12. At least one of such two or more pieces of information may also be vehicle state information indicating the state of the cruise control switch 26, a value detected by a sensor, etc. The aforementioned cruise control-purpose vehicle information is an example of the vehicle state information. With the above-described arrangement, it is possible to acquire information indicating an actual control result, information serving as a reference for use in generating control information, etc. Since the control information is transmitted via communication between ECUs, the control information may be termed communication information. The vehicle state information includes information that is transmitted to another ECU via communication, and information that is not transmitted to another ECU via communication. The information that is transmitted in this manner may be considered communication information.

The control abnormalities are detected in: (d) a case where at least two of a plurality of pieces of communication information received do not have a logical consistency; (e) a case where a piece of communication information transmitted from the first ECU to another ECU and a piece of communication information transmitted from the another ECU back to the first ECU do not have a logical consistency; (f) a case where a piece of communication information received by an ECU and a piece of information generated by that ECU or a value detected by a sensor or the like connected to that ECU do not have a logical consistency; etc.

A communication abnormality detecting program is executed by each ECU at predetermined time intervals or every time information is transmitted.

Figure 17:
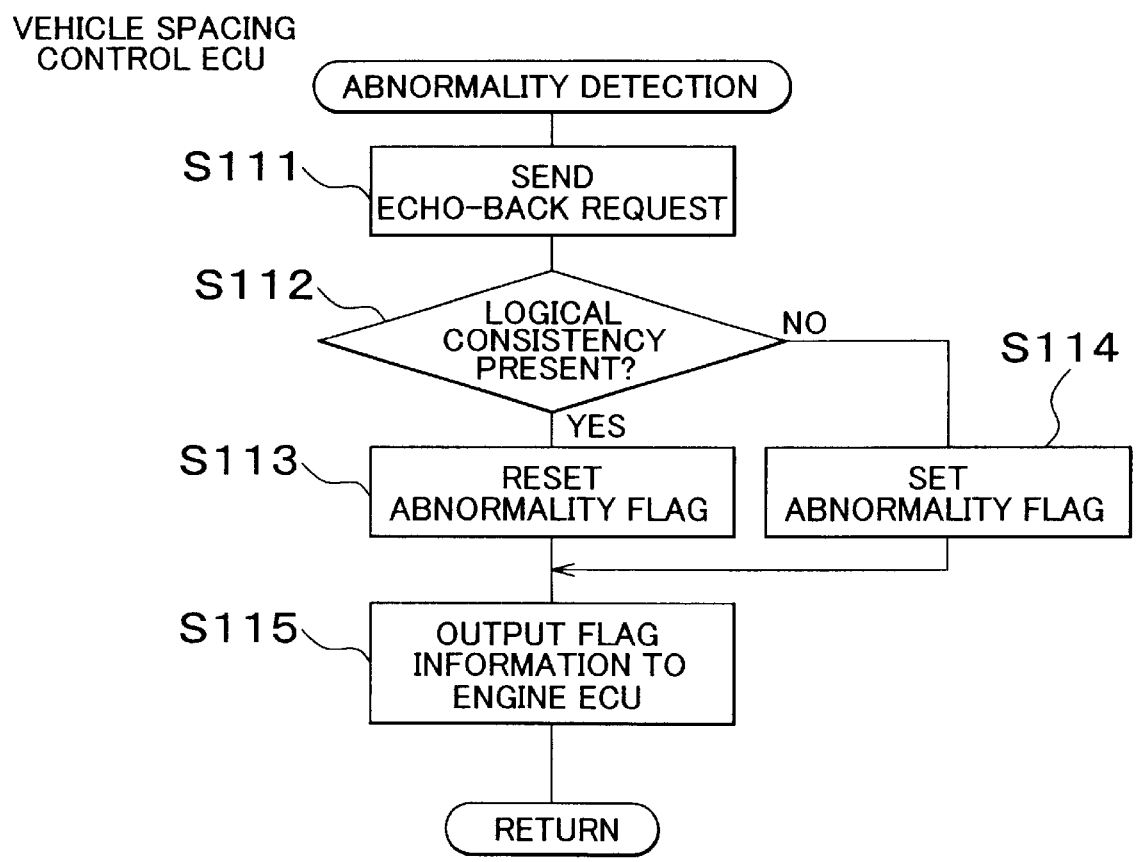
FIG. 17 is a flowchart illustrating an abnormality detecting program stored in the ROM of the vehicle spacing control ECU.

The vehicle spacing control ECU 12 executes an abnormality detecting program illustrated by the flowchart of FIG. 17, every time the vehicle spacing control ECU 12 transmits communication information to the engine ECU 14. In S111, the vehicle spacing control ECU 12 transmits an echo-back request to the engine ECU 14. In S112, the vehicle spacing control ECU 12 determines whether the information transmitted from the vehicle spacing control ECU 12 to the engine ECU 14 and the information transmitted from the engine ECU 14 to the vehicle spacing control ECU 12 have a logical consistency. For example, in a case where the brake request presence information is transmitted and the information echoed back contains the brake request absence information, it is determined that the information transmitted and the information echoed back do not have a logical consistency.

If the transmitted information and the echoed-back information have a logical consistency, an abnormality flag is reset in S113. If the transmitted information and the echoed-back information do not have a logical consistency, the abnormality flag is set in S114. Subsequently in S115, information indicating the state of the abnormality flag is transmitted to the engine ECU 14.

It is also possible to adopt a construction in which with regard to information sent back from the engine ECU 14 and received by the vehicle spacing control ECU 12, it is detected whether there is an abnormality in the state of reception of the information.

The engine ECU 14 detects whether there is an abnormality with regard to both the communication with the vehicle spacing control ECU 12 and the communication with the brake ECU 16.

Figure 18:
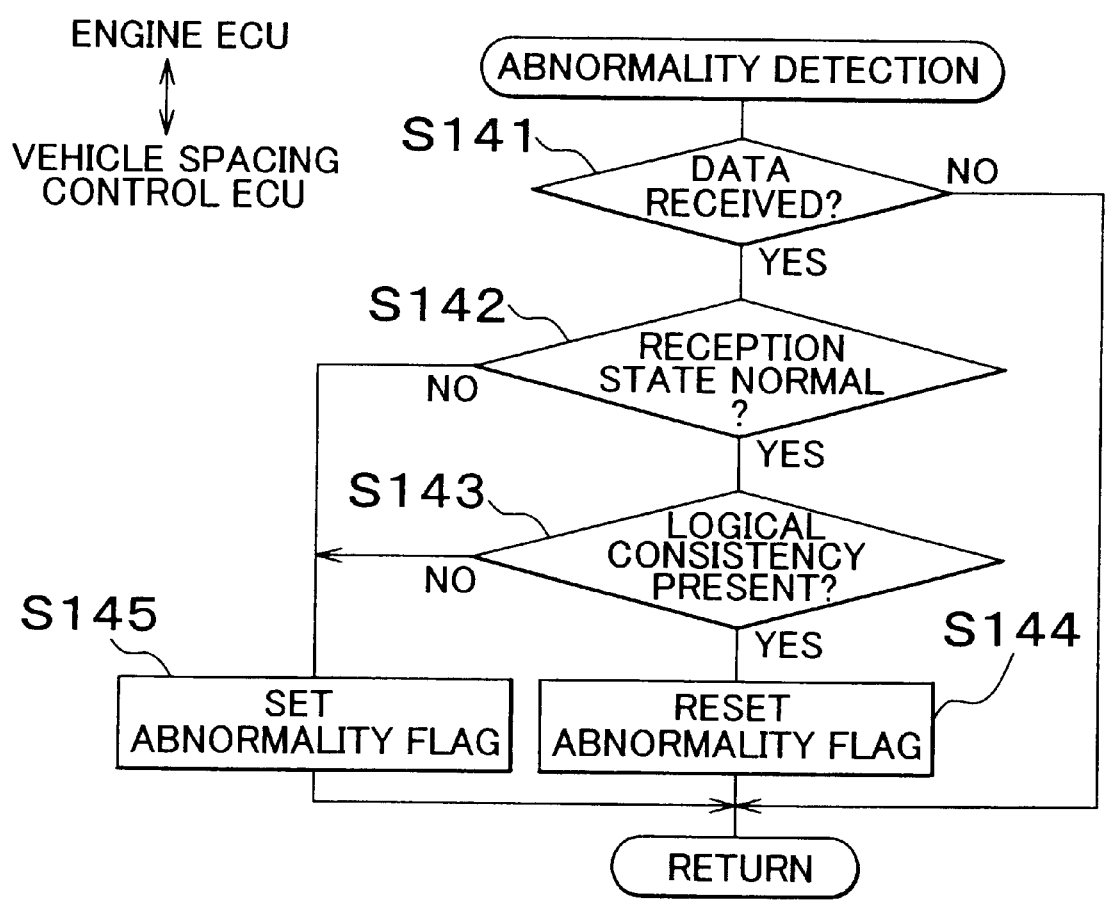
FIG. 18 is a flowchart illustrating an abnormality detecting program stored in the ROM of the engine ECU.

With regard to the communication with the vehicle spacing control ECU 12, the engine ECU 14 determines in S141 in the flowchart sh in FIG. 18 whether communication information has been received. If such information has been received, it is determined in S142 whether the state of reception of the information is normal. Subsequently in S143, it is determined whether a logical consistency exists. For example, if the information received contains the brake request presence information and the brake-purpose target deceleration α*nB that is a positive value, it is determined that a logical consistency exists, for example, provided that the target deceleration α*n which is a positive value and the dshift-to-third speed command are contained and that the degree of throttle opening detected by the engine ECU 14 is "0". In contrast, for example, if the degree of throttle opening is great or the cruise control switch 26 is at the off position although the brake request presence information is contained in the information received, it is determined that a logical consistency does not exist. If a logical consistency exists, the abnormality flag is reset in S144. If a logical consistency does not exist, the abnormality flag is set in S145. It is also possible to adopt a construction in which the abnormality detecting program is executed every time information is received. When information is received, a process starting at S142 is executed.

Figure 19:
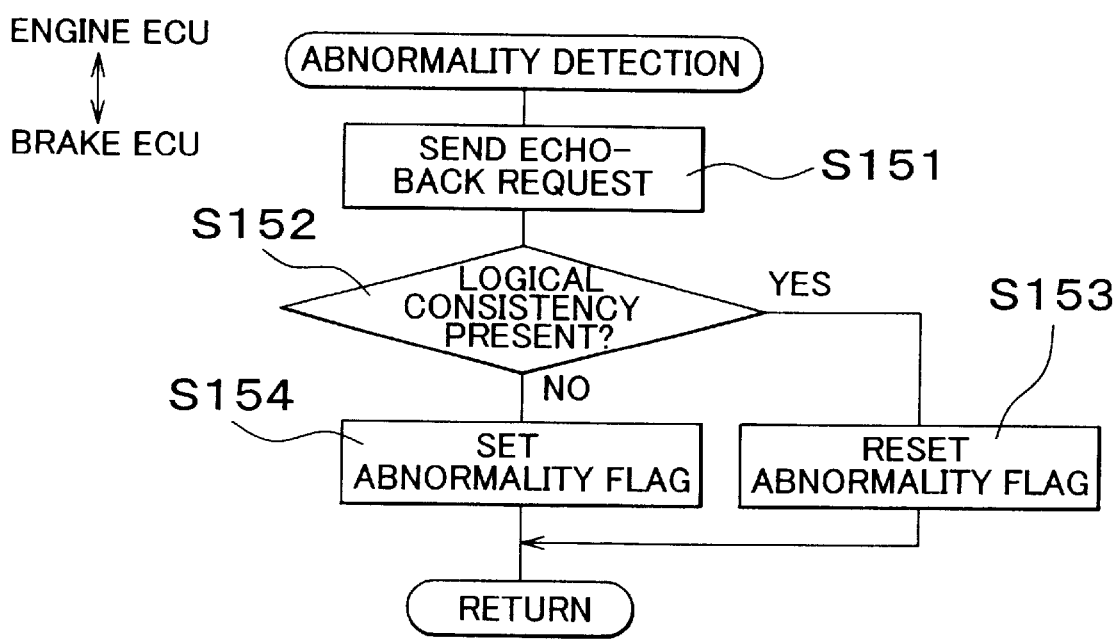
FIG. 19 is a flowchart illustrating an abnormality detecting program stored in the ROM of the engine ECU.

With regard to communication with the brake ECU 16, the engine ECU 14 transmits to the brake ECU 16 information indicating the presence/absence of a brake request and the like, and then transmits thereto an echo-back request in S151 as shown in the flowchart of FIG. 19. In S152, the engine ECU 14 determines whether the transmitted information and the sent-back information have a logical consistency. For example, if the sent-back information contains the brake request absence information whereas the transmitted information contains the brake request presence information, it is determined that a logical consistency does not exist. If a logical consistency exists, the abnormality flag is reset in S153. If a consistency condition is not met, the abnormality flag is set in S154.

It is also possible for the engine ECU 14 to request specific information generated by the brake ECU 16, as well as the echo-back request. For example, the engine ECU 14 may determine whether there is a logical consistency between specific information received from the brake ECU 16 and at least one of information transmitted from the engine ECU 14 to the brake ECU 16 and information generated by the engine ECU 14. For example, if the brake request presence information is transmitted from the engine ECU 14 to the brake ECU 16 in a case where a brake in-operation flag prepared by the brake ECU 16 so as to indicate that the operating state of the brake is in the set state, it is determined that a logical consistency exists. Conversely, if the cruise control switch 26 is in the on-state and the engine ECU 14 has transmitted the brake request presence information but the brake in-operation flag transmitted from the brake ECU 16 is in the reset state, it is determined that a logical consistency does not exist. Thus, in this case, it is determined whether there is a logical consistency between communication information (control command value) received from another ECU and at least one of information generated by the ECU and information detected by that ECU.

Figure 20:
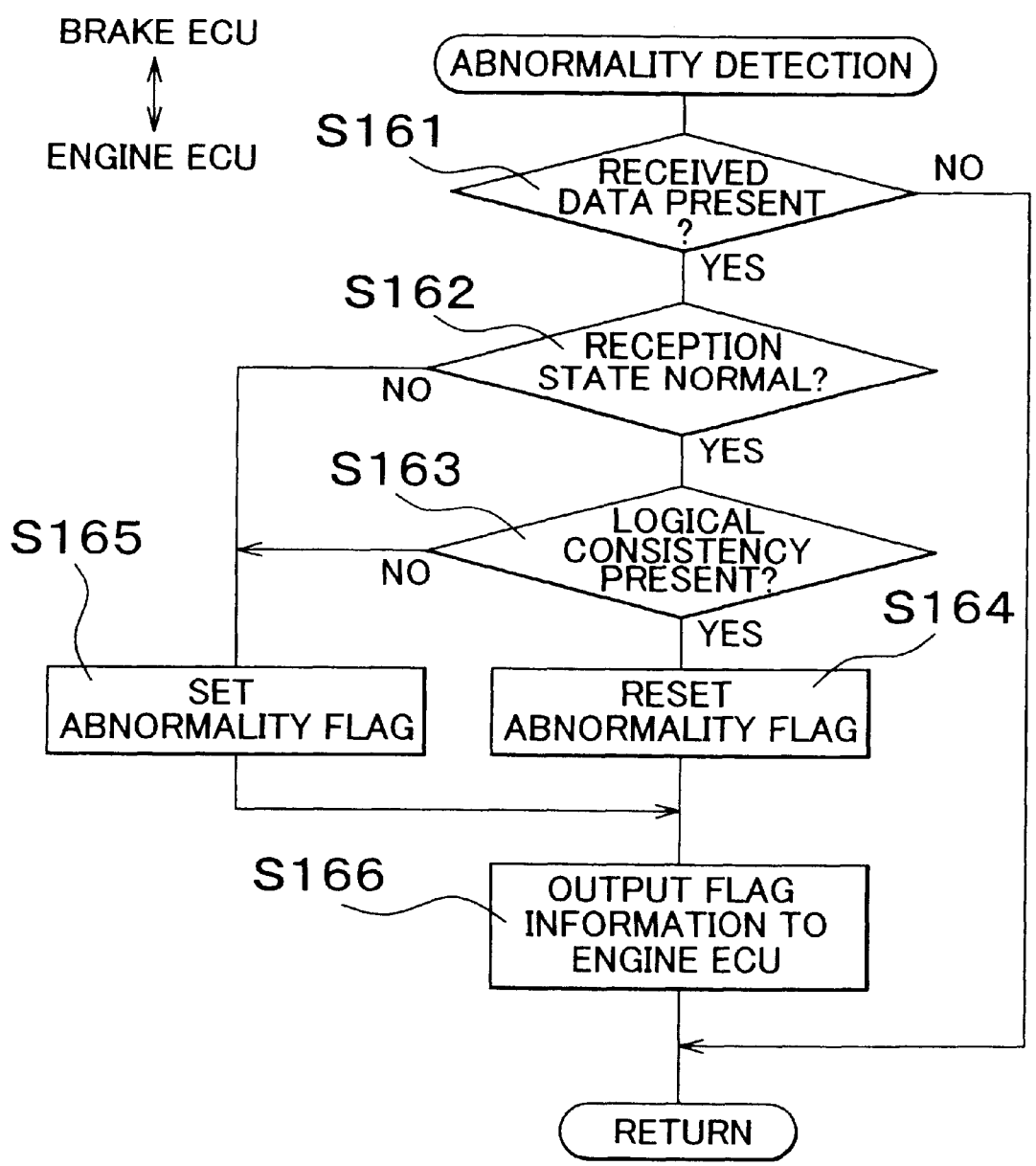
FIG. 20 is a flowchart illustrating an abnormality detecting program stored in the ROM of the brake ECU.

Likewise, the brake ECU 16 executes an abnormality detecting program illustrated by the flowchart of FIG. 20. In S161, the brake ECU 16 determines whether communication information has been received. In S162, the brake ECU 16 determines whether the state of reception is normal. In S163, the brake ECU 16 determines whether there is a logical consistency. For example, if information received contains the brake request presence information and information indicating the brake-purpose target deceleration α*nB, which is a positive value, it is determined that a logical consistency exists. If there is a logical consistency, the abnormality flag is reset in S164, whereas that flag is set in S165 if there is not a logical consistency. Then in S166, the state of an abnormality flag is transmitted to the engine ECU 14.

As described above, in the embodiment, control abnormalities are detected, as well as abnormalities of various component elements and communication abnormalities. Therefore, the occasion of detection of an abnormality can be increased. Furthermore, a control abnormality can be detected in an early period. Therefore, false execution of the brake control or the engine control can be avoided, and the reliability of the system can be improved.

It is effective to adopt a design in which a control abnormality is detected in a stage of developing a system. If in the developing stage, it is detected that a logical consistency does not exist between at least two pieces of information, it means that there is a possibility of an abnormality in a control program. Therefore, it is possible to correspondingly examine and correct a control program. In this case, it is desirable that the presence/absence of a logical consistency between at least two pieces of information containing communication information be detected. An abnormality can be detected by comparing information generated by a first ECU and information generated by another ECU.

It is also practicable to adopt a construction in which if a control abnormality is detected, only the brake control is prohibited and the controls of the engine and the like are permitted. This is because with a control abnormality, the brake control has a greater effect on the running state of the vehicle. It is also possible to detect a control abnormality by utilizing information regarding communication between the engine ECU 14 and the transmission ECU 34.

The manner of the cruise control is not limited to that described in conjunction with the foregoing embodiment. For example, the control of the engine and the like may be performed in the same manner before actuation of the brake and after release of the brake. In any case, the control can be performed based on at least one of the deceleration deviation and the target deceleration. The magnitudes of the threshold and the like may be the same before actuation of the brake and after release of the brake.

It is not essential for the running control apparatus to be a system that includes a plurality of ECUs. The running control apparatus may be a system that includes only one ECU.

The construction of the brake circuit is not restricted by the foregoing embodiment. It is not essential for the brake circuit to allow the antilock brake control or the vehicle behavior control. The only requirement for the brake circuit is that automatic brake actuation be feasible.

The brake 62 is not limited to a hydraulic brake, but may also be an electric brake in which a friction member is pressed against a brake rotating body by an electric motor. The vehicle may be a vehicle that includes both an internal combustion engine and an electric motor as drive apparatus, and may also be a vehicle that includes an electric motor but does not include an engine. In such cases, it is possible to adopt a construction in which the state of operation of the electric motor provided as a drive apparatus is controlled if the necessity for deceleration is low. Thus, the vehicle is not limited to an engine-driven vehicle, but may also be a hybrid vehicle, an electric vehicle, etc.

While the invention has been described with reference to preferred embodiments thereof, it is to be understood that the invention is not limited to the preferred embodiments or constructions. To the contrary, the invention is intended to cover various modifications and equivalent arrangements. In addition, while the various elements of the preferred embodiments are shown in various combinations and configurations, which are exemplary, other combinations and configurations, including more, less or only a single element, are also within the spirit and scope of the invention.

What is claimed is:

1. A running control apparatus that controls a running state of a vehicle based on a relative positional relationship between the vehicle and a preceding vehicle running ahead of the vehicle in a preset area, comprising:

a control system that determines a probability that an object detected in the preset area is in a same lane as the vehicle; and a braking system which actuates a brake that retards rotation of a wheel of the vehicle when the relative positional relationship between the vehicle and the preceding vehicle indicates that the vehicle should be decelerated, wherein the relative positional relationship between the vehicle and the preceding vehicle indicating that the vehicle should be decelerated includes a state in which the determined probability is equal to or greater than a preset probability, wherein the braking system actuates the brake to retard rotation of the wheel of the vehicle if a degree of a necessity to decelerate the vehicle, which is determined based on the relative positional relationship between the vehicle and the preceding vehicle, is higher than a preset degree.

2. A running control apparatus according to claim 1, wherein the control system determines whether the object detected in the preset area is the preceding vehicle.

3. A running control apparatus according to claim 2, wherein the control system determines that the object detected in the preset area is the preceeding vehicle by:

determining whether the object detected in the preset area is in a moving state or a stationary state, and determining whether the object is at least one of a vehicle running on an opposite lane and a vehicle passing an intersection.

4. A running control apparatus according to claim 3, wherein the control system determines that the detected object is a vehicle when the detected object has a size larger than a preset size, and determines that the detected object is not the vehicle when the detected object has a size smaller than the preset size.

5. A running control apparatus according to claim 2, wherein the control system determines that the detected object is a vehicle when the detected object has a size larger than a preset size, and determines that the detected object is not the vehicle when the detected object has a size smaller than the preset size.

6. A running control apparatus according to claim 1, further comprising an object detector which detects an object in the preset area in front of the vehicle.

7. A running control apparatus according to claim 6, further comprising an actual deceleration detector which detects an actual deceleration of the vehicle, wherein the braking system actuates the brake if a deceleration deviation-related amount is equal to or greater than a preset deviation-related amount, the deceleration deviation-related amount being related to a value obtained by subtracting the detected actual deceleration from a target deceleration determined based on a desired relative positional relationship and an actual relative positional relationship detected by the object detector.

8. A running control apparatus that controls a running state of a vehicle based on a relative postional relationship between the vehicle and a preceding vehicle running ahead of the vehicle in a preset area, comprising:

a control system that determines a probability that an object detected in the preset area is in a same lane as the vehicle; and a braking system which actuates a brake that retards rotation of a wheel of the vehicle when the relative positional relationship between the vehicle and the preceding vehicle indicates that the vehicle should be decelerated, wherein the relative positional relationship between the vehicle and the preceding vehicle indicating that the vehicle should be decelerated includes a state in which the determined probability is equal to or greater than a preset probability, wherein if the relative positional relationship indicates that the vehicle should be decelerated, the braking system controls at least one of a driving device that supplies power to drive the vehicle and a power transmitting device that is disposed between the driving device and the wheel of the vehicle such that the vehicle is decelerated, prior to actuation of the brake.

9. A running control apparatus according to claim 8, wherein the braking system controls at least one of the driving device and the power transmitting device if the relative positional relationship meets a preset controlling condition, and the braking system actuautes the brake if the relative positional relationship meets a brake actuating condition.

10. A running control apparatus that controls a running state of a vehicle based on a relative positional relationship between the vehicle and a preceding vehicle running ahead of the vehicle in a preset area, comprising:

a control system that determines a probability that an object detected in the preset area is in a same lane as the vehicle; and a braking system which actuates a brake that retards rotation of a wheel of the vehicle when the relative positional relationship between the vehicle and the preceding vehicle indicates that the vehicle should be decelerated, wherein the relative positional relationship between the vehicle and the preceding vehicle indicating that the vehicle should be decelerated includes a state in which the determined probability is equal to or greater than a preset probability, further comprising:

a brake controller which is included in the braking system, and which actuates the brake and controls a brake operation state;

the control system permits or prohibits actuation of the brake based on at least one of a state of the brake controller and a running state of a vehicle, and an alarm which produces an alarm signal when actuation of the brake is prohibited by the control system.

11. A running control apparatus according to claim 10, wherein the braking system comprises a brake controller which controls an operation state of the brake, and the brake controller comprises a cruise control portion which controls an operation state of the brake in accordance with a necessity to decelerate the vehicle.

12. A running control apparatus according to claim 11, wherein the brake controller also comprises an antilock control portion which controls the brake such that in a case where the brake is in actuated state and where a value indicating a slip state of the wheel that is in a locked state is larger than a preset value even when a brake operating member is not operated by a vehicle operator, the slip state of the wheel is brought into an appropriate range.

13. A running control apparatus according to claim 10, wherein the braking system comprises a brake controller which controls an operation state of the brake, and the brake controller comprises an antilock control portion which controls the brake such that in a case where the brake is in an actuated state and where a value indicating a slip state of the wheel that is in a locked state is larger than a preset value even when a brake operating member is not operated by a vehicle operator, the slip state of the wheel is brought into an appropriate range.

14. A running control apparatus according to claim 10, wherein the control system includes a vehicle behavior control portion which controls at least one of the brake and the driving device, if a behavior of the vehicle is unstable as compared with a set state, such that the behavior of the vehicle is brought into an appropriate state.

15. A running control apparatus that controls a running state of a vehicle based on a relative positional relationship between the vehicle and a preceding vehicle running ahead of the vehicle in a preset area, comprising:

a control command value determining controller which determines a control command value related to deceleration of the vehicle based on the relative positional relationship between the vehicle and the preceding vehicle;

a brake controller which controls an operation state of a brake that retards rotation of a wheel of the vehicle in accordance with the control command value received from the control command value determining controller; and a control abnormality detector which detects a control abnormality based on logical consistency of contents of a plurality of pieces of information containing information transmitted between the control command value determining controller and the brake controller.

16. A running control apparatus according to claim 15, further comprising a controller which controls at least one of a driving device that supplies power to drive the vehicle and a power transmitting device disposed between the driving device and the wheel of the vehicle in response to the control command value transmitted from the control command value determining controller, wherein the control abnormality detector detects the control abnormality based on the plurality of pieces of the information containing information regarding communication among the control command value determining controller, the brake controller, and the controller.

17. A running control apparatus according to claim 15, wherein the brake controller prohibits actuation of the brake in at least one state of:

(a) a case where a value corresponding to a slip state of the wheel of the vehicle is equal to or greater than a set value, or a case where there is a high possibility that the value corresponding to the slip state of the wheel of the vehicle becomes equal to or greater than the set value; and (b) the brake controller is in a state in which actuation of the brake is undesirable.

18. A running control apparatus according to claim 15, wherein the brake controller prohibits actuation of the brake if the control abnormality is detected by the control abnormality detector.

19. A running control apparatus that controls a running state of a vehicle based on a relative positional relationship between the vehicle and a preceding object ahead of the vehicle in a preset area, comprising:

a control system that determines a probability that an object detected in the set area is in a same lane as the vehicle; and a braking system which operates a brake that retards rotation of a wheel of the vehicle when the relative positional relationship between the vehicle and the preceding object indicates that the vehicle should be decelerated, wherein the relative positional relationship between the vehicle and the preceding object indicating that the vehicle should be decelerated includes a state in which the determined probability is equal to or greater than a preset probability.

20. A running control method for controlling a running state of a vehicle based on a relative positional relationship between the vehicle and a preceding vehicle running ahead of the vehicle in a preset area, comprising the steps of:

determining a probability that an object detected in the set area is in a same lane as the vehicle; and actuating a brake that retards rotation of a wheel of the vehicle when one of the relative positional relationship between the vehicle and the preceding vehicle indicates that the vehicle should be decelerated, wherein the relative positional relationship between the vehicle and the preceding vehicle indicating that the vehicle should be decelerated includes a state in which the determined probability is equal to or greater than a predetermined probability.

21. A running control method according to claim 20, wherein if the relative positional relationship indicates that the vehicle should be decelerated, at least one of a driving device which supplies power to drive the vehicle and a power transmitting device that is disposed between the driving device and the wheel of the vehicle is controlled to decelerate the vehicle prior to actuation of the brake.

22. A running control method according to claim 20, wherein the vehicle includes a brake controller which controls an operation state of the brake, and actuation of the brake is permitted or prohibited based on at least one of a state of the brake controller and a running state of the vehicle, and an alarm is produced when actuation of the brake is prohibited.

23. A running control method for controlling a running state of a vehicle based on a relative positional relationship between the vehicle and a preceding vehicle running ahead of the vehicle in a preset area, comprising the steps of:

determining a control command value related to deceleration of the vehicle based on a relative positional relationship between the vehicle and the preceding vehicle;

controlling an operation state of a brake that retards rotation of a wheel of the vehicle in accordance with the determined control command value; and detecting a control abnormality based on a logical consistency of contents of a plurality of pieces of information containing a piece of information transmitted from or to a controller that produces the control command value.

* * * * *